(12) United States Patent
Noro et al.

(10) Patent No.: US 10,846,325 B2
(45) Date of Patent: Nov. 24, 2020

(54) INFORMATION SEARCH SYSTEM AND INFORMATION SEARCH PROGRAM

(71) Applicant: EBA JAPAN CO., LTD., Tokyo (JP)

(72) Inventors: Naoki Noro, Tokyo (JP); Yohei Takara, Tokyo (JP); Fuminori Ando, Tokyo (JP)

(73) Assignee: EBA JAPAN CO., LTD., Tokyo (JP)

( * ) Notice: Subject to any disclaimer, the term of this patent is extended or adjusted under 35 U.S.C. 154(b) by 27 days.

(21) Appl. No.: 16/309,921

(22) PCT Filed: Oct. 24, 2018

(86) PCT No.: PCT/JP2018/039469
§ 371 (c)(1),
(2) Date: Dec. 13, 2018

(87) PCT Pub. No.: WO2019/187277
PCT Pub. Date: Oct. 3, 2019

(65) Prior Publication Data
US 2020/0065326 A1  Feb. 27, 2020

(30) Foreign Application Priority Data
Mar. 27, 2018 (JP) .................. 2018-060572

(51) Int. Cl.
*G01N 21/27* (2006.01)
*G01J 3/46* (2006.01)
(Continued)

(52) U.S. Cl.
CPC ............ *G06F 16/5838* (2019.01); *G01J 3/46* (2013.01); *G01N 21/27* (2013.01); *G06N 3/08* (2013.01)

(58) Field of Classification Search
CPC ...... G01J 3/00; G01J 3/28; G01J 3/46; G06K 9/228; G06K 9/0063; G06K 9/48;
(Continued)

(56) References Cited

U.S. PATENT DOCUMENTS 7,450,761 B2 * 11/2008 Portigal .............. G06K 9/0063
382/103
7,692,797 B2   4/2010 Kawahara
(Continued)

FOREIGN PATENT DOCUMENTS

JP   2009505107 A   2/2009
JP   2009053064 A   3/2009
(Continued)

OTHER PUBLICATIONS

Multispectral photography for earth resources; 1972; (Year: 1972).*
(Continued)

*Primary Examiner* — Luis Perez-Fuentes
(74) *Attorney, Agent, or Firm* — Holtz, Holtz & Volek PC

(57) ABSTRACT

An information search system for searching detection algorithm information of spectral data necessary for determining a target event from a photographed subject includes a first relational database that stores a first relevance index having at least three levels between each target event of the subject and the detection algorithm information in advance, a target event input unit that receives information regarding a target event of the subject to be newly determined, a search unit that searches at least one piece of detection algorithm information on the basis of information regarding the target event received by the target event input unit by referencing the first relevance index, and a receive unit that receives information regarding the target event of the photographed subject from a photographing terminal that photographs the subject. The first relational database updates the first rel- (Continued)

evance index on the basis of the information received by the receive unit.

20 Claims, 21 Drawing Sheets

(51) Int. Cl.
  *G06F 16/583* (2019.01)
  *G06N 3/08* (2006.01)
(58) Field of Classification Search
  CPC ...... G06T 2207/00; G06T 2207/10036; H04N 5/235; G01N 21/31
  See application file for complete search history.

(56) References Cited

U.S. PATENT DOCUMENTS

| | | | |
|---|---|---|---|
| 8,295,578 | B2 | 10/2012 | Lundgren et al. |
| 8,416,337 | B2* | 4/2013 | Ishigami ............... H04N 5/235 348/348 |
| 2005/0122513 | A1* | 6/2005 | Masten ............... A01M 7/0089 356/328 |
| 2007/0043527 | A1 | 2/2007 | Quan et al. |
| 2008/0123097 | A1* | 5/2008 | Muhammed .......... G01J 3/0218 356/419 |
| 2010/0201800 | A1 | 8/2010 | Yamamoto et al. |
| 2011/0273558 | A1 | 11/2011 | Subbiah et al. |
| 2012/0081546 | A1 | 4/2012 | Matsumoto |
| 2012/0200682 | A1* | 8/2012 | Mestha ................ G06K 9/0063 348/61 |
| 2013/0077958 | A1 | 3/2013 | Xu et al. |
| 2013/0286396 | A1 | 10/2013 | Matsumoto |
| 2014/0163391 | A1 | 6/2014 | Koizumi et al. |
| 2014/0350395 | A1 | 11/2014 | Shachaf et al. |
| 2016/0150213 | A1* | 5/2016 | Mutti .................... G06K 9/4604 348/143 |
| 2019/0147294 | A1* | 5/2019 | Noro ...................... G01N 21/27 348/161 |
| 2020/0065326 | A1* | 2/2020 | Noro ......................... G01J 3/46 |

FOREIGN PATENT DOCUMENTS

| | | |
|---|---|---|
| JP | 2010185719 A | 8/2010 |
| JP | 2011095225 A | 5/2011 |
| JP | 2012078156 A | 4/2012 |
| JP | 2015505051 A | 2/2015 |
| JP | 2015166682 A | 9/2015 |
| JP | 2017003495 A | 1/2017 |
| WO | 2012090416 A1 | 7/2012 |
| WO | 2013002350 A1 | 1/2013 |

OTHER PUBLICATIONS

NPL Google Search; 2020; (Year: 2020).*
Multispectral photography for earth resources; 1972; (Year: 1072).*
Multispectral imaging, image processing and classification for agriculture; Lobo; 2000; (Year: 2000).*
Anna Dankowska, "Detection of plant oil addition to cheese by synchronous fluorescence spectroscopy," Dairy Science & Technology, Mar. 15, 2015, vol. 95, pp. 413-424.
Fulin Luo, et al., "Semisupervised Sparse Manifold Discriminative Analysis for Feature Extraction of Hyperspectral Images," IEEE Transactions on Geoscience and Remote Sensing, vol. 54, No. 10, Oct. 2016, pp. 6197-6211.
International Search Report (ISR) dated Jul. 24, 2018 issued in International Application No. PCT/JP2018/018219.
Related U.S. Appl. No. 16/309,927; Title: Information Search System, Information Search Method, and Information Search Program; First Named Inventor: Naoki Noro, filed Dec. 13, 2018.
Written Opinion dated Jul. 24, 2018 issued in International Application No. PCT/JP2018/018219.
Office Action (Non-Final Rejection) dated Mar. 30, 2020 issued in related U.S. Appl. No. 16/309,927.
Notice of Allowance dated Jul. 29, 2020 issued in related U.S. Appl. No. 16/309,927.

* cited by examiner

FIG. 10

| REFERENCE TARGET EVENT OF SUBJECT | PHOTOGRAPHING CONDITION |
|---|---|
| FRESHNESS OF FRUIT | WHITE BALANCE XX |
| MOISTURE OF HAIR | LENS ARRANGEMENT P, FILTER W |
| PHOTOSYNTHESIS OF LEAF | FILTER Q |
| STOMACH CANCER | FILTER R, ILLUMINATION LIGHT ANGLE XX° |
| DEFECT OF GLASS | FILTER S, SPATIAL RESOLUTION 133 to 140 dpi |
| | EXPOSURE TIME OF XX ns OR LONGER |
| | EXPOSURE TIME SHORTER THAN XX ns |

SECOND RELEVANCE INDEX

80%, 20%, 40%, 60%, 100%, 80%, 20%, 100%, 40%, 20%

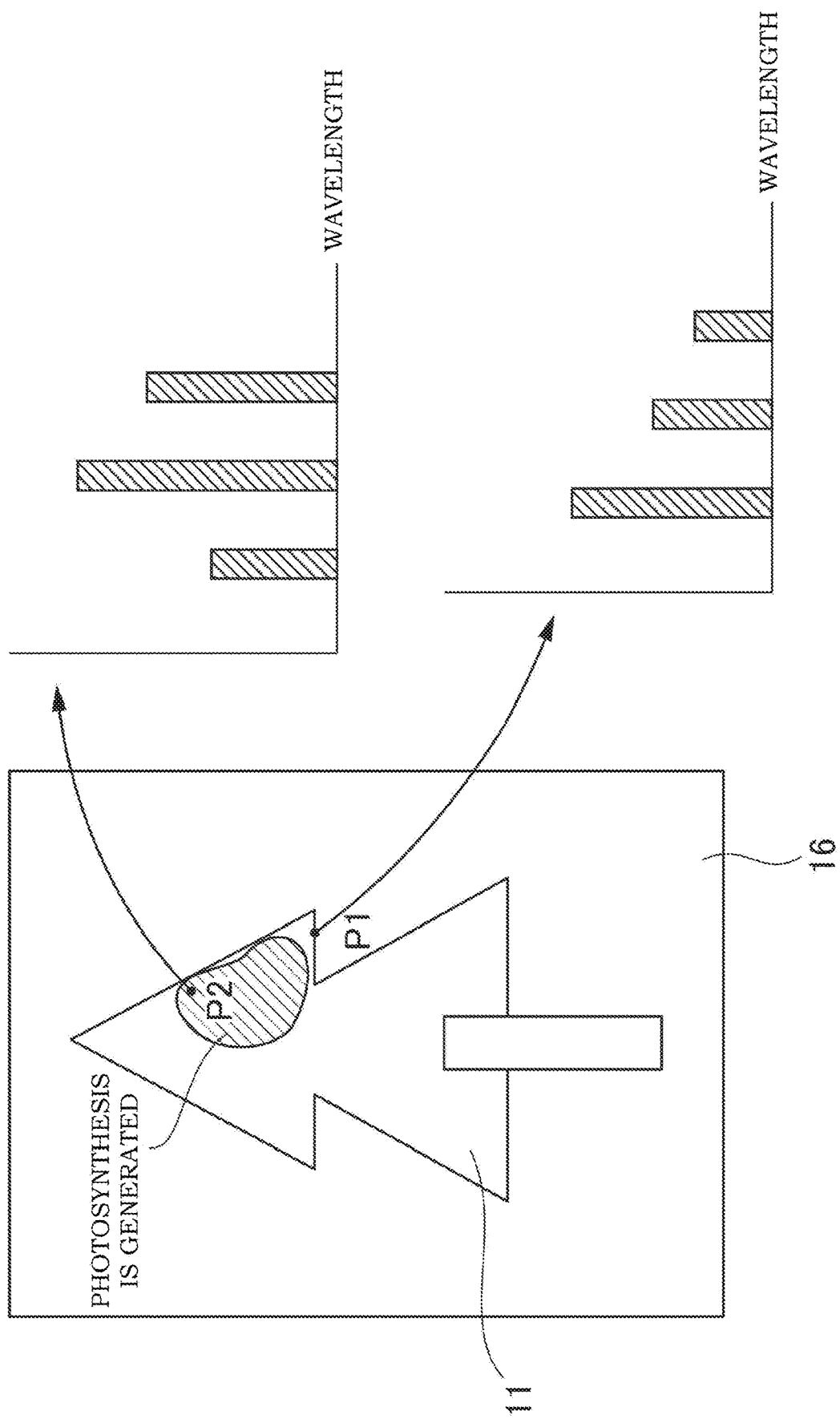

INFORMATION SEARCH SYSTEM AND INFORMATION SEARCH PROGRAM

TECHNICAL FIELD

The present invention relates to an information search system and an information search program suitable for automatically searching detection algorithm information for acquiring spectral data necessary for determining a target event from a subject or various photographing conditions of a photographing apparatus that photographs the subject.

BACKGROUND ART

In the prior art, a spectral image capturing device capable of determining a desired event in a subject by spectrometrically analyzing a photographic image of a subject on a wavelength basis has been proposed. The spectral image capturing device can acquire high wavelength resolution spectrometric information (hereinafter, referred to as "hyperspectral data") across several tens of wavelength regions from an ultraviolet wavelength range to an infrared wavelength range with a wavelength resolution of 0.1 nm to 100 nm. By utilizing such hyperspectral data, it is possible to analyze, for example, freshness of foods, defects of building structures, photosynthesis of plants, chemical elements contained in minerals, moisture or spots of skin, and the like with high precision. That is, using the spectral image capturing device, it is possible to not only simply photograph a subject but also detect a target event in the subject.

Examples of the spectral image capturing device capable of acquiring the hyperspectral data are disclosed, for example, in Patent Documents 1 and 2.

Patent Document 1 discusses a spectral image capturing device in which a tumor region in a human organism is set as a target event. In this technique of Patent Document 1, a tumor region and a non-tumor region are distinguished by detecting an element deposited in a cancer cell by focusing on a fluorescent wavelength.

Patent Document 2 discusses an information processing apparatus for determining whether or not a subject is a fruit. It is determined whether or not a subject is a fruit by acquiring a reference characteristic amount of the fruit in advance and comparing it with a characteristic amount of a spectral image of the subject actually photographed. All of the reference characteristic amounts are based on spectral data.

In addition, a technique focusing on an image analysis of the hyperspectral data has been also discussed (for example, see Patent Document 3).

CITATION LIST

Patent Documents

Patent Document 1: PCT International Publication No. WO2013/002350
Patent Document 2: JP-A-2017-3495
Patent Document 3: JP-A-2015-166682

SUMMARY OF INVENTION

Technical Problem

However, it takes a lot of time and labor to research the detection algorithm for acquiring the spectral data necessary for determining a target event in a subject. This also requires technical knowledge.

For example, in the detection algorithm for obtaining spectral data on a tumor region in a human organism described above, a detection algorithm capable of detecting the fluorescence is organized by focusing on a fact that protoporphyrin IX accumulated in a cancer cell emits fluorescence at a wavelength of 635 nm, and photoprotoporphyrin emits fluorescence at a wavelength of 675 nm. In order to organize such a detection algorithm, it is necessary to know technical knowledge such as what element is accumulated in the cancer cell, or what wavelength the fluorescence emits, or the like. In addition, it takes a lot of time and labor to make various studies for precisely extracting only the fluorescence and accurately determine it.

For this reason, a technology capable of easily acquiring an optimum detection algorithm whenever a new target event is sequentially generated in the subject was demanded in the prior art. However, Patent Documents 1 to 3 fail to discuss a technology for acquiring an optimum detection algorithm depending on the target event of the subject.

The optimal detection algorithm evolves as time goes by, and it is difficult to say that the detection algorithm currently used is optimal at all times. For this reason, it is necessary for the detection algorithm to acquire the latest external environment and update it from time to time on the basis of the latest external environment. In this regard, Patent Documents 1 to 3 fail to discuss a technology for updating the detection algorithm on the basis of the acquired latest external environment.

In addition, in this detection algorithm updating process, the detection precision can be improved by referencing the spectral data of the subject photographed using the existing detection algorithm. However, currently, there is no particular proposal for a technology of referencing such spectral data of the subject photographed using the existing detection algorithm including the techniques discussed in Patent Documents 1 to 3 described above.

In view of the aforementioned problems, it is therefore an object of the invention to provide an information search system and an information search program capable of updating the detection algorithm on the basis of the latest external environment acquired using the detection algorithm in order to automatically search detection algorithm information for acquiring spectral data necessary for determining a target event from a subject.

Solution to Problem

According to the present invention, there is provided an information search system for searching detection algorithm information of spectral data necessary for determining a target event from a photographed subject, the information search system including: a first relational database configured to store a first relevance index having three or more levels between each target event of the subject and the detection algorithm information in advance; target event input means configured to receive information regarding a target event of the subject to be newly determined; search means configured to search one or more pieces of detection algorithm information on the basis of information regarding the target event received by the target event input means by referencing the first relevance index stored in the first relational database; and receive means configured to receive information regarding the target event of the photographed subject from a photographing terminal that photographs the subject, wherein the first relational database updates the first relevance index on the basis of the information received by the receive means.

According to the present invention, there is provided an information search system for searching detection algorithm information of spectral data necessary for determining a target event from a photographed subject, the information search system including: a first relational database configured to store a first relevance index having three or more levels between each target event of the subject and the detection algorithm information in advance; target event input means configured to receive information regarding a target event of the subject to be newly determined; search means configured to search one or more pieces of detection algorithm information on the basis of information regarding the target event received by the target event input means by referencing the first relevance index stored in the first relational database; receive means configured to receive multispectral data as information regarding the target event of the photographed subject from a photographing terminal that photographs the subject on the basis of the detection algorithm information searched by the search means; and data restoration means configured to restore hyperspectral data on the basis of the multispectral data received by the receive means, wherein the first relational database updates the first relevance index on the basis of the spectral data restored by the data restoration means.

According to the present invention, there is provided an information search system for searching a photographing condition of a photographing apparatus for determining a target event from a photographed subject, the information search system including: a second relational database configured to store a second relevance index having three or more levels between each target event of the subject and each photographing condition in advance; target event input means configured to receive information regarding a target event of the subject to be newly determined; search means configured to search one or more photographing conditions on the basis of information regarding the target event received by the target event input means by referencing the second relevance index stored in the second relational database; and receive means configured to receive information regarding the target event of the photographed subject from a photographing terminal that photographs the subject, wherein the second relational database updates the second relevance index on the basis of the information received by the receive means.

According to the present invention, there is provided an information search system for searching a photographing condition of a photographing apparatus for determining a target event from a photographed subject, the information search system including: a second relational database configured to store a second relevance index having three or more levels between each target event of the subject and each photographing condition in advance; target event input means configured to receive information regarding a target event of the subject to be newly determined; search means configured to search one or more photographing conditions on the basis of information regarding the target event received by the target event input means by referencing the second relevance index stored in the second relational database; receive means configured to receive multispectral data as information regarding the target event of the photographed subject from a photographing terminal that photographs the subject on the basis of the photographing condition searched by the search means; and data restoration means configured to restore hyperspectral data on the basis of the multispectral data received by the receive means, wherein the second relational database updates the second relevance index on the basis of the spectral data restored by the data restoration means.

According to the present invention, there is provided an information search program for searching detection algorithm information of spectral data necessary for determining a target event from a photographed subject, the information search program causing a computer to execute: a relevance index acquiring step of acquiring a first relevance index having three or more levels between each target event of the subject and the detection algorithm information in advance; a target event input step of inputting information regarding a target event of the subject to be newly determined; a search step of searching one or more pieces of the detection algorithm information on the basis of information regarding the target event input in the target event input step by referencing the first relevance index acquired in the relevance index acquiring step; and a receiving step of receiving the information regarding the target event of the photographed subject from a photographing terminal that photographs the subject, wherein, in the relevance index acquiring step, the first relevance index is updated on the basis of the information received in the receiving step.

According to the present invention, there is provided an information search program for searching detection algorithm information of spectral data necessary for determining a target event from a photographed subject, the information search program causing a computer to execute: a relevance index acquiring step of acquiring a first relevance index having three or more levels between each target event of the subject and the detection algorithm information in advance; a target event input step of inputting information regarding a target event of the subject to be newly determined; a search step of searching one or more pieces of detection algorithm information on the basis of information regarding the target event input in the target event input step by referencing the first relevance index acquired in the relevance index acquiring step; a receiving step of receiving multispectral data as information regarding the target event of the photographed subject from a photographing terminal that photographs the subject on the basis of the detection algorithm information searched in the search step; and a data restoration step of restoring hyperspectral data on the basis of the multispectral data received in the receiving step, wherein, in the relevance index acquiring step, the first relevance index is updated on the basis of the spectral data restored in the data restoration step.

According to the present invention, there is provided an information search program for searching a photographing condition of a photographing apparatus for determining a target event from a photographed subject, the information search program causing a computer to execute: a relevance index acquiring step of acquiring a second relevance index having three or more levels between each target event of the subject and each photographing condition in advance; a target event input step of inputting information regarding a target event of the subject to be newly determined; a search step of searching one or more photographing conditions on the basis of information regarding the target event input by the target event input step by referencing the second relevance index acquired in the relevance index acquiring step; and a receiving step of receiving information regarding the target event of the photographed subject from a photographing terminal that photographs the subject, wherein, in the relevance index acquiring step, the second relevance index is updated on the basis of the information received in the receiving step.

According to the present invention, there is provided an information search program for searching a photographing condition of a photographing apparatus for determining a target event from a photographed subject, the information search program causing a computer to execute: a relevance index acquiring step of acquiring a second relevance index having three or more levels between each target event of the subject and each photographing condition in advance; a target event input step of inputting information regarding a target event of the subject to be newly determined; a search step of searching one or more photographing conditions on the basis of information regarding the target event input by the target event input step by referencing the second relevance index acquired in the relevance index acquiring step; a receiving step of receiving multispectral data as information regarding the target event of the photographed subject from a photographing terminal that photographs the subject on the basis of the photographing condition searched in the search step; and a data restoration step of restoring hyperspectral data on the basis of the multispectral data received in the receiving step, wherein, in the relevance index acquiring step, the second relevance index is updated on the basis of the spectral data restored in the data restoration step.

Advantageous Effects of Invention

According to the present invention having the aforementioned configuration, it is possible to easily acquire optimum detection algorithm information of the spectral data depending on a target event of the subject to be determined therefrom. For this reason, it is possible to reduce a burden of labor for researching the optimum detection algorithm and shorten time whenever a new target event of the subject is sequentially generated.

In addition, according to the present invention, it is possible to further optimize the detection algorithm and improve detection precision by referencing the spectral data of the subject photographed using the existing detection algorithm in the detection algorithm updating process.

BRIEF DESCRIPTION OF DRAWINGS

FIG. 10 is a diagram a network in which reference target events of a subject and photographing conditions are associated with each other using a second relevance index;

FIG. 15 is a diagram for describing an example in which spatial information is included;

DESCRIPTION OF EMBODIMENTS

An information search system according to the present invention will now be described in details with reference to the accompanying drawings.

Figure 1:
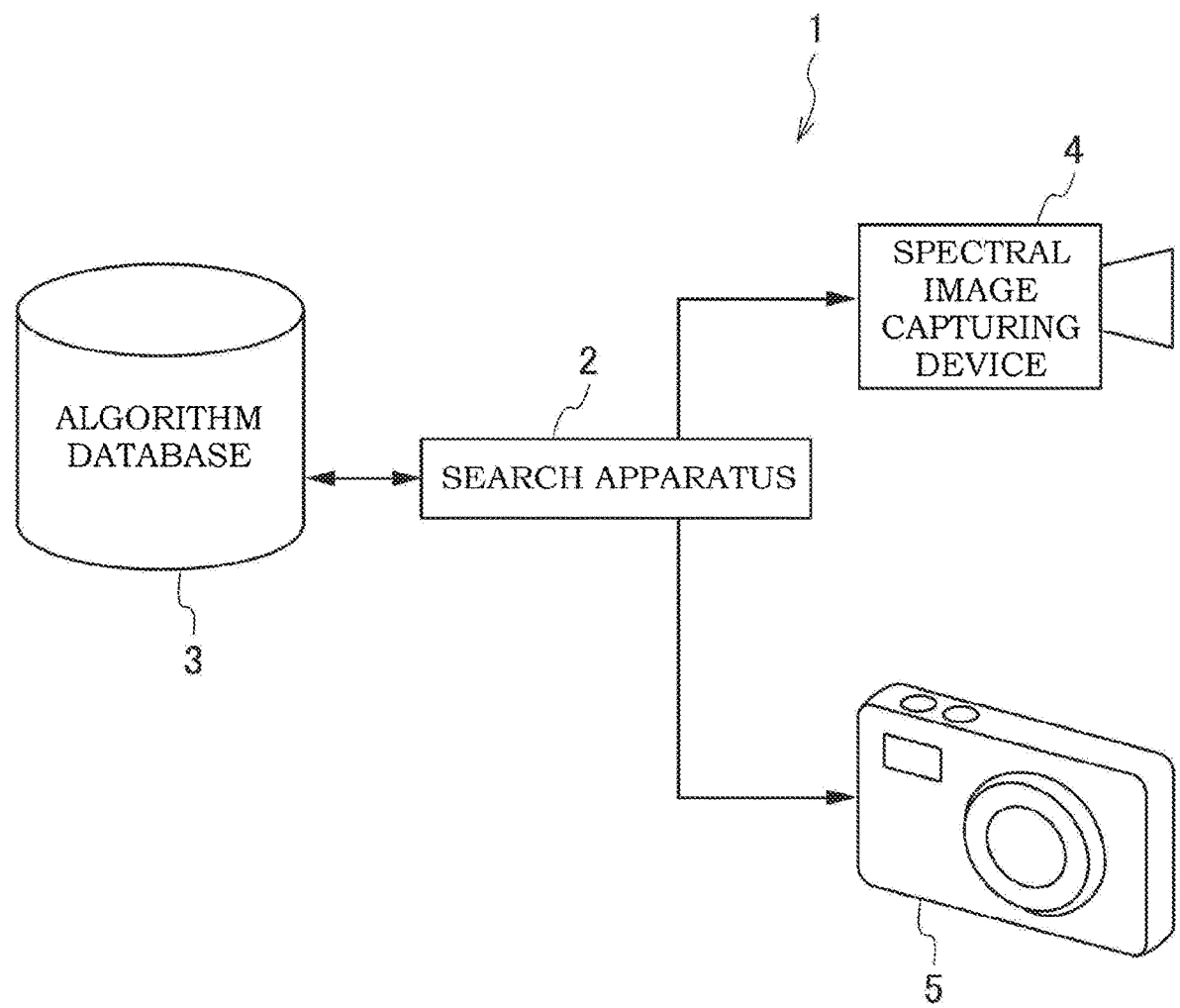
FIG. 1 is a block diagram illustrating a general configuration of an information search system according to the invention.

FIG. 1 is a block diagram illustrating a general configuration of the information search system 1 according to the present invention. The information search system 1 is to search detection algorithm information to be provided to a spectral image capturing device 4. The information search system 1 includes an algorithm database 3, a search apparatus 2 connected to the algorithm database, and a spectral image capturing device 4 and a photographing apparatus 5 connected to the search apparatus 2.

The algorithm database 3 has a database built to provide the detection algorithm information to the spectral image capturing device 4. In addition, the algorithm database 3 has a database regarding a photographing condition of the photographing apparatus 5. In this algorithm database 3, information transmitted via a public communication network or information input by a user of the system is accumulated. Furthermore, the algorithm database 3 transmits the accumulated information to the search apparatus 2 in response to a request from the search apparatus 2.

The search apparatus 2 is an electronic device such as a personal computer (PC). Alternatively, the search apparatus 2 may be implemented using any other electronic devices such as a mobile phone, a smart phone, a tablet terminal, or a wearable terminal instead of the PC.

Figure 2:
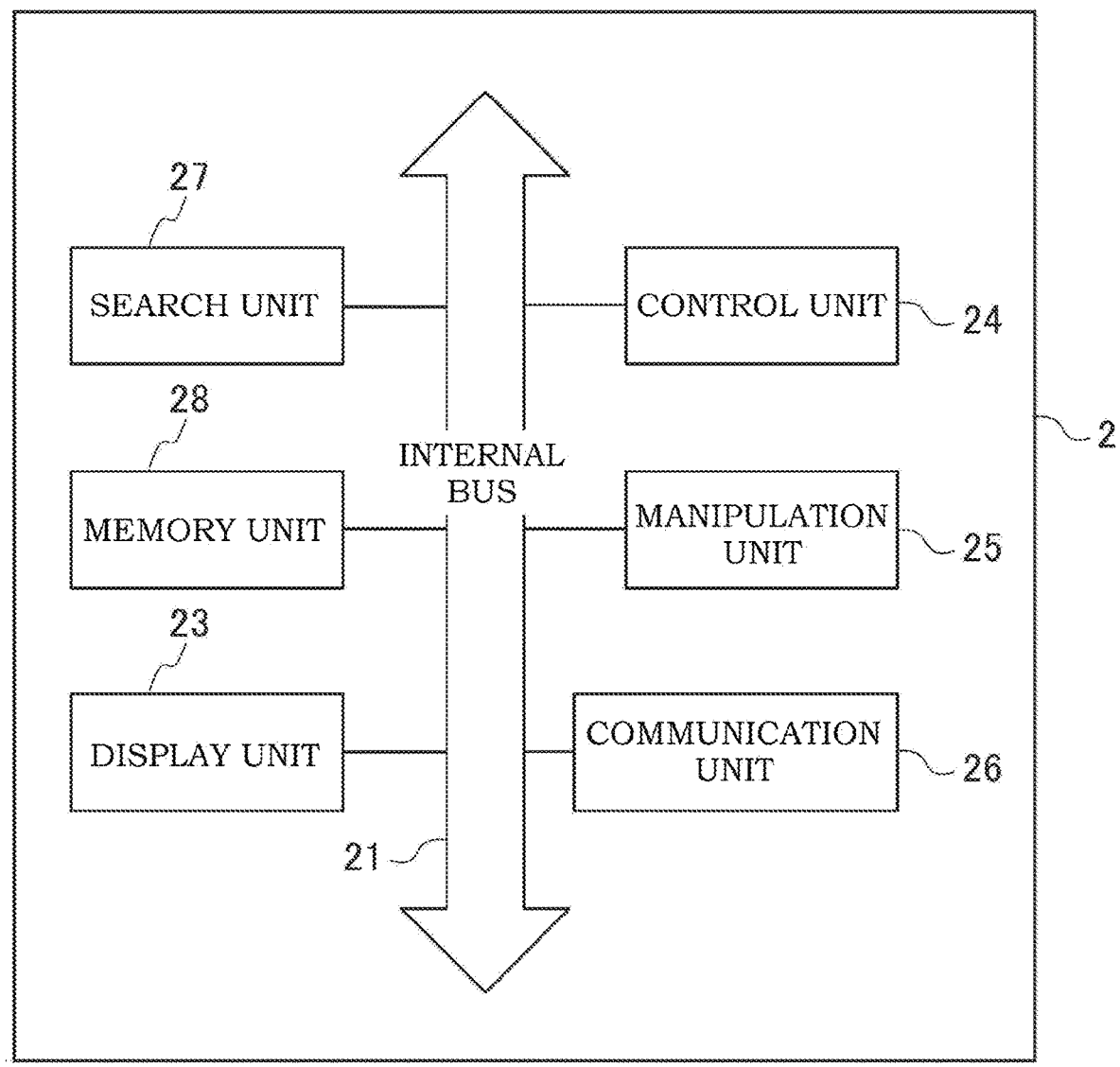
FIG. 2 is a block diagram illustrating a search apparatus of the information search system.

FIG. 2 is an exemplary specific configuration of the search apparatus 2. The search apparatus 2 includes a control unit 24 for controlling the entire search apparatus 2, a manipulation unit 25 for inputting various control instructions using a manipulation button, a keyboard, or the like, a communication unit 26 for performing wired communication or radio communication, a search unit 27 that searches optimum detection algorithm information, and a memory unit 28 such as a hard disk that stores a program for executing the search. They are connected to each other via an internal bus 21. In addition, a display unit 23 as a monitor for actually displaying information is connected to the internal bus 21.

The control unit 24 is a so-called central control unit for controlling each element embedded in the search apparatus 2 by transmitting a control signal via the internal bus 21. In addition, the control unit 24 transmits various control instructions via the internal bus 21 in response to a manipulation on the manipulation unit 25.

The manipulation unit 25 is implemented using a keyboard or a touch panel and receives an execution command for executing the program from a user. When the execution command is received from a user, the manipulation unit 25 notifies it to the control unit 24. The notified control unit 24 activates the search unit 27 and allows each element to cooperate with each other to executing a desired processing operation.

The search unit 27 searches detection algorithm information of spectral data necessary for determining a target event from the subject photographed by the spectral image capturing device 4. The search unit 27 reads various types of information stored in the memory unit 28 or various types of information stored in the algorithm database as information necessary for executing the search operation. The search unit 27 may be controlled by artificial intelligence. The artificial intelligence may be based on any artificial intelligence technique known in the art.

The display unit 23 has a graphic controller that creates a display image under control of the control unit 24. The display unit 23 includes, for example, a liquid crystal display (LCD) or the like.

Under control of the control unit 24, predetermined information is written to or read from each address of the memory unit 28 such a hard disk as necessary. In addition, the memory unit 28 stores a program for executing the present invention. The program is read and executed by the control unit 24.

Figure 3:
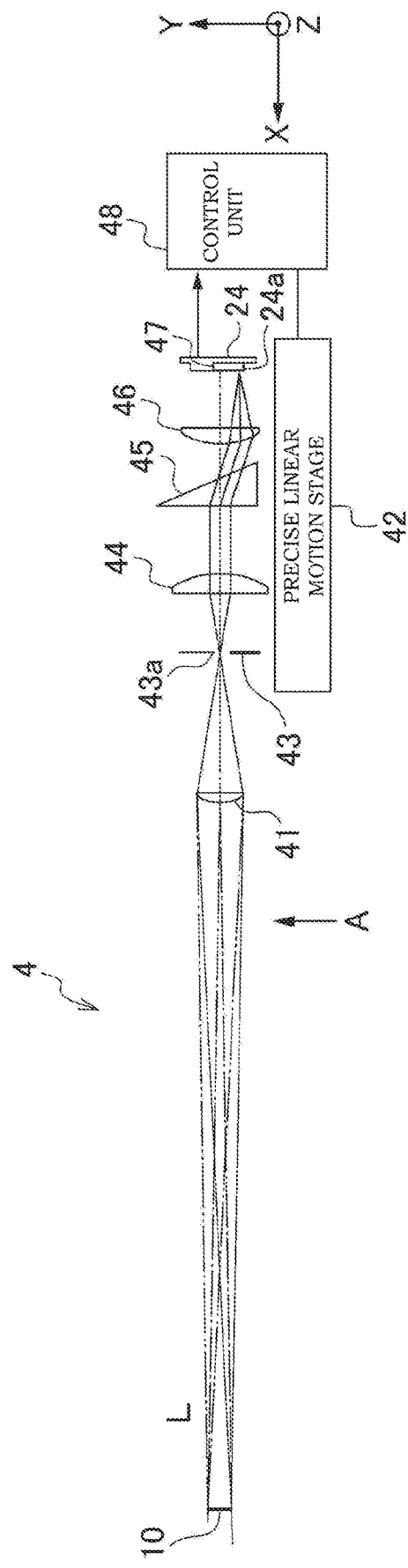
FIG. 3 is a block diagram illustrating a spectral image capturing device of the information search system.

FIG. 3 illustrates an exemplary configuration of the spectral image capturing device 4. The spectral image capturing device 4 includes a so-called multispectral camera, a color filter exchangeable camera, or a prism type camera. The spectral image capturing device 4 photographs a subject and acquires a spectral image therefrom. The spectral image capturing device 4 creates a spectral image on the basis of three-dimensional spectral data having two-dimensional spatial information from the two-dimensional spectral data in each photographing location and one-dimensional wavelength information. The spectral image created by the spectral image capturing device 4 includes a plurality of two-dimensional images representing reflectance or transmittance of the subject for each wavelength. An example of the spectral image may have a wavelength resolution of 0.1 nm to 100 nm within a wavelength region having a predetermined wavelength range of 200 nm to 13 μm, so that spectral images are created for each band.

Note that the wavelength range in the spectral image photographed by the spectral image capturing device 4 includes an infrared range, a near-infrared range, and an ultraviolet range as well as the visible light range.

The spectral image capturing device 4 includes an objective lens 41 that captures light emitted from a photographic target by itself or light reflecting on or transmitting through the subject 10, that is, photographic light L from the subject 10, a precise linear motion stage 42 that moves in a Y-axis direction on a Cartesian coordinate system having X, Y, and Z axes, a slit plate 43 for arranging a slit opening 43a provided in the Z-axis direction on an image plane of the objective lens 41, a collimator lens 44 for collimating light beams transmitting through the slit opening 43a, an dispersive optical element 45 that disperses the collimated light from the collimator lens 44, a imaging lens 46 that captures the light beams emitted from the dispersive optical element 45, an image capturing element 47 provided on the image plane of the imaging lens 46, and a control unit 48 that controls the precise linear motion stage 42 and the image capturing element 47 to perform various processings for the image data received through the image capturing element 47. Note that the spectral image capturing device 4 may be provided using the technique disclosed in JP-A-2015-166682.

The precise linear motion stage 42 integrally shifts the slit plate 43, the collimator lens 44, the dispersive optical element 45, the imaging lens 46, and the image capturing element 47 along the Y-axis direction under control of the control unit 48.

The dispersive optical element 45 is implemented, for example, using diffraction gratings, a prism, and the like. The dispersive optical element has a function of dispersing the light beams passing through the collimator lens 44 on a wavelength component basis.

The image capturing element 47 includes, for example, a CCD image sensor, a CMOS image sensor, or the like. The image capturing element 47 converts the light focused on the image plane into an electrical signal through optoelectric conversion. In addition, the electric signal converted by the image capturing element 47 is transmitted to the control unit 48. A suitable image capturing element 47 is arranged to match infrared, near-infrared, or ultraviolet light depending on the received light.

Figure 4:
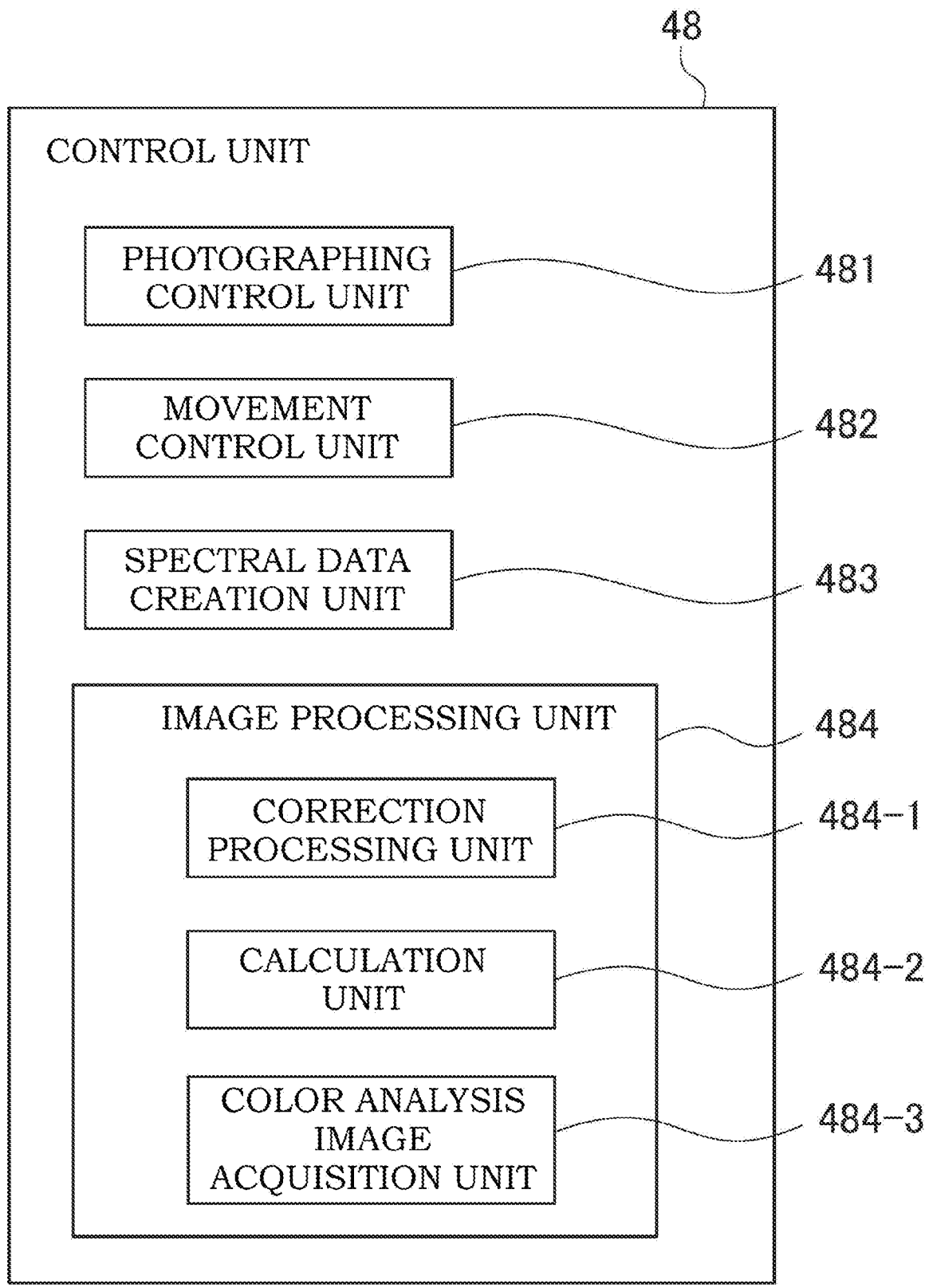
FIG. 4 is a diagram for describing a detailed configuration of a control unit of the spectral image capturing device.

FIG. 4 illustrates a configuration of the control unit 48 in more details. The control unit 48 includes a photographing control unit 481 that controls a timing for acquiring the electric signal in the image capturing element 47, a movement control unit 482 that controls a shift direction, a shift amount, and a shift timing of the precise linear motion stage 42 along the Y-axis direction, a spectral data creation unit 483 that creates spectral data on the basis of the electric signal from the image capturing element 47, and an image processing unit 484 that performs various image processings or corrections on the basis of the spectral data created by the spectral data creation unit 483. Note that a part or all of the elements of the control unit 48 may also be embedded in an independent personal computer (PC).

The spectral data creation unit 483 creates two-dimensional spectral data having one-dimensional spatial information and one-dimensional wavelength information on the basis of the electric signal transmitted from the image capturing element 47 and stores them. By repeatedly executing this processing, the spectral data creation unit 483 can obtain a hyperspectral image consisting of three-dimensional spectral data including two-dimensional spatial information and one-dimensional wavelength information as the photographing operation is completed for all the photographing locations.

The image processing unit 484 converts the wavelength-based spectral image created by the spectral data creation unit 483 into a predetermined color system and performs a color operation process in order to create a color analysis image. In addition, the image processing unit 484 performs a processing for displaying the created color analysis image on the basis of a predetermined display method. The image processing unit 484 includes a correction processing unit 484-1, a calculation unit 484-2, and a color analysis image acquisition unit 484-3.

The correction processing unit 484-1 performs rejection of noise caused by dark currents, correction of pixel-to-pixel sensitivity difference, luminance correction, correction of unevenness of light source illumination in a space, and the like.

The calculation unit 484-2 calculates each spectral radiance, each spectral luminance and the like of each wavelength-based spectral image processed by the correction processing unit 484-1.

The color analysis image acquisition unit 484-3 performs color space conversion for converting the spectral image into a color system satisfying a standard set using various parameters corrected by the correction processing unit 484-1, and each spectral radiance and each spectral luminance calculated by the calculation unit 484-2, and the like.

In the color analysis image acquisition unit 484-3, the color analysis image subjected to the color space conversion is transmitted to a PC or the like (not shown) and is visualized on a display or the like.

Figure 5:
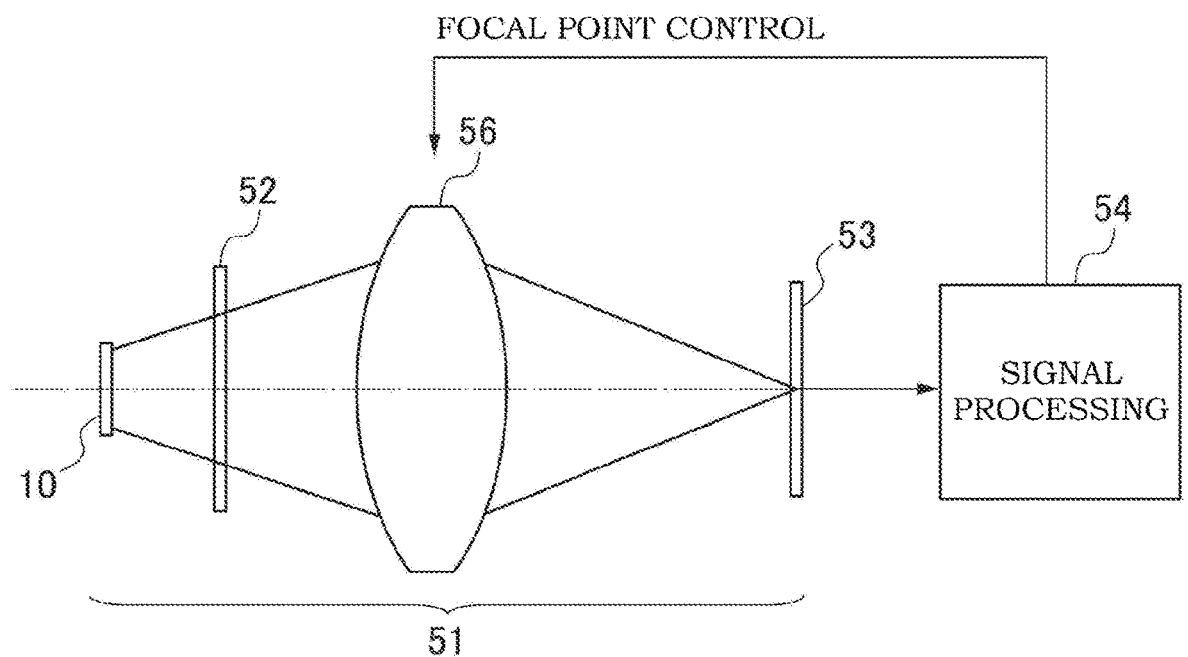
FIG. 5 is a diagram illustrating an exemplary block configuration of a photographing apparatus.

FIG. 5 illustrates an exemplary block configuration of the photographing apparatus 5. The photographing apparatus 5 includes a typical digital camera, a multispectral camera, or any type of digital camera mounted on a mobile phone, a smart phone, a tablet terminal, and a wearable terminal. While the spectral image capturing device 4 can detect spectral data of all wavelength ranges, the photographing apparatus 5 is intended to limitatively detect spectral data of a particular wavelength region set in advance in addition to image photographing for a typical visible range. The photographing apparatus 5 includes an imaging optical system 51, a filter 52, an image capturing element 53, and a signal processing unit 54.

The imaging optical system 51 has at least one image capturing lens 56 to condense the light from the subject 10 to form an image on an image plane of the image capturing element 53.

The filter 52 is arranged between the subject 10 and the image capturing lens 56. The filter 52 is arranged in the middle of an optical path to the image capturing element 53. The filter 52 is an element having a predetermined spectral transmittance. That is, the filter 52 transmits only the light belonging to a predetermined wavelength region and reflects the light of other wavelength regions. The type of the filter 52 is selected depending on a wavelength of the light to be transmitted in practice and a wavelength bandwidth. Although the filter 52 is assumed to be fixed in advance in the photographing apparatus 5 in this example, the invention is not limited thereto. That is, the filter 52 may be configured such that a plurality of filters 52 having different transmission wavelength regions are sequentially switchable.

The image capturing element 53 includes a CCD image sensor, a CMOS image sensor, or the like. The image capturing element 53 converts the light focused on an image plane into an electric signal through photoelectric conversion. In addition, the electric signal converted by the image capturing element 53 is transmitted to the signal processing unit 54.

The signal processing unit 54 is a circuit for processing the electric signal transmitted from the image capturing element 53. The signal processing unit 54 creates a spectral separation image separated for each wavelength region of the light from the subject 10 on the basis of the image acquired by the image capturing element 53. In addition, the signal processing unit 54 may perform various focal point control operations on the basis of the acquired electric signal.

Operations of the information search system 1 having the aforementioned configuration according to the first embodiment will now be described.

First, the search apparatus 2 searches detection algorithm information to be provided to the spectral image capturing device 4 or the photographing apparatus 5 or detection algorithm information to be provided to the photographing apparatus 5. This search process starts as a user inputs a target event of a subject to be newly photographed by the spectral image capturing device 4 or the photographing apparatus 5. Here, the "subject" is a generic term referring to an object actually photographed by the spectral image capturing device 4 or the photographing apparatus 5, and the "target event" refers to an object or work to be determined using the spectral image capturing device 4 or the photographing apparatus 5. For example, assuming that it is desired to determine only salt from a mixture of salt and sugar, the subject is the mixture, and the target event is the salt. For example, assuming that it is desired to determine only oil from a mixture of water and oil, the subject is the mixture, and the target event is the oil. For example, assuming that it is desired to determine freshness of sushi, the subject is the sushi, and the target event is the freshness. For example, assuming that it is desired to determine a spot on a face, the subject is the face, and the target event is the spot. For example, assuming that it is desired to determine a stomach cancer from a stomach, the subject is the stomach, and the target event is the stomach cancer.

A user manually inputs a target event of a subject using the manipulation unit 25. In this input operation, text data regarding the target event of the subject created by another electronic device such as a mobile terminal or a PC may also be input via the Internet.

The target event of the subject transmitted or input in this manner is stored in the memory unit 28.

Figure 6:
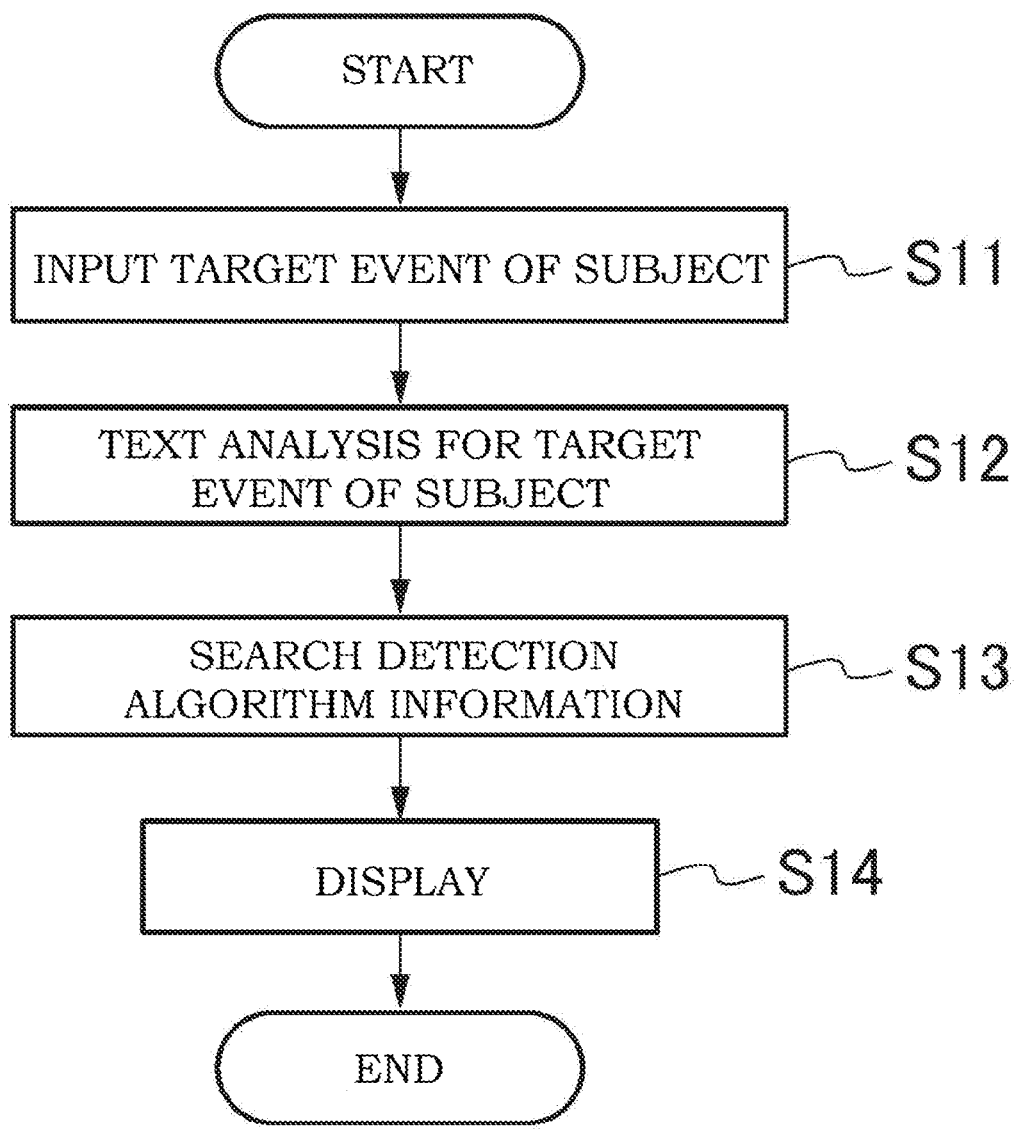
FIG. 6 is a flowchart illustrating a processing operation sequence of an information search program.

After the target event of the subject is input in this manner, the processing operation using the information search program is executed in practice. A processing operation flow of the information search program is illustrated in FIG. 6.

The information search program performs a text analysis for the target event of the subject input in step S11 and stored in the memory unit 28 (step S2). In this text analysis, any one of existing techniques such as a text mining technique, a data mining technique, and a language analysis processing technique may be employed.

Then, the information search program extracts a character string over one or more units out of all grammatical structural units such as words, morphemes, phrases, and clauses from the target event of the subject to be analyzed. For example, assuming that text data "leg blood vessel" is input as the target event of the subject, character strings "leg" and "blood vessel" are extracted. For example, assuming that text data "facial moisture" is input, character strings "face" and "moisture" are extracted. The information search program specifies the subject and the target event from the extracted character strings. In the aforementioned example, "leg" and "face" are extracted as the subject, and "blood vessel" and "moisture" are extracted as the target event. Typically, a character string of a subject is located before a character string of the target event in many cases. Therefore, the subject and the target event are specified starting from the head of the extracted character string.

Alternatively, a user may separately input the subject and the target event in advance, for example, by setting "leg" as the subject and setting "blood vessel" as the target event. In this case, the input character strings of the subject and the target event are directly received.

Then, the information search program advances to step S13 and searches detection algorithm information having a high relevance index with the character string extracted in step S12. Before this search operation, the algorithm database 3 acquires, in advance, a target event for reference (hereinafter, referred to as "reference target event") and a relevance index having three or more levels of the detection algorithm information having two or more classifications (hereinafter, referred to as "first relevance index").

Figure 7:
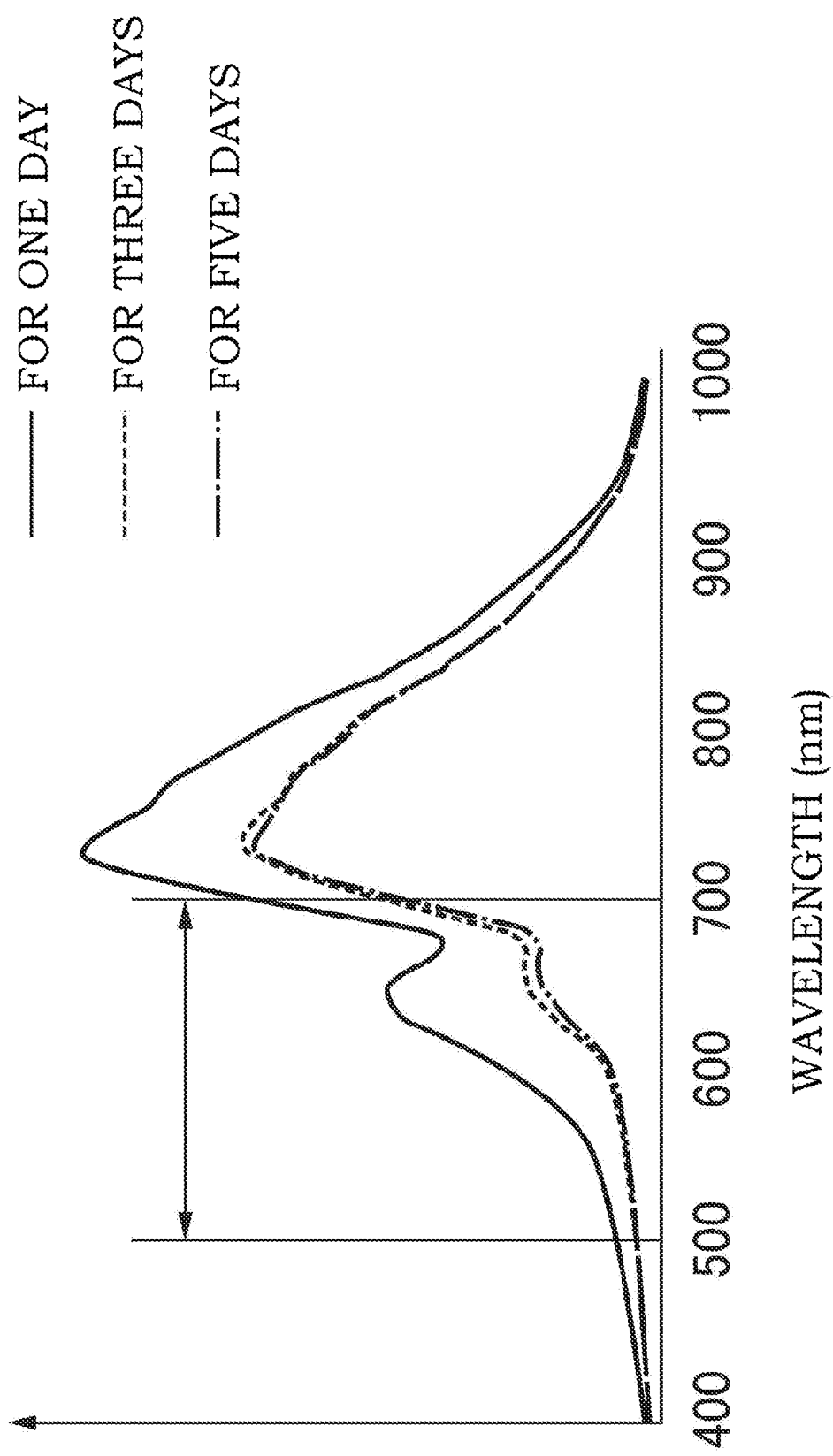
FIG. 7 is a diagram for describing an example for determining freshness of fruit using spectral data.

Here, the "detection algorithm information" refers to an algorithm for detecting spectral data necessary for determining a target event by actually photographing a subject using the spectral image capturing device 4 or the photographing apparatus 5. For example, as illustrated in FIG. 7, it is assumed that it is already known that a spectral intensity (reflectance) across a wavelength range of 500 nm to 700 nm is different depending on freshness of a certain fruit. That is, it is known that the spectral intensity (reflectance) abruptly changes at a wavelength range of 500 nm to 700 nm when any fruit is placed under the room temperature for a day, for three days, and for five days. In this case, it is possible to determine freshness of fruit by creating a spectral image at the wavelength range of 500 nm to 700 nm.

Any wavelength of the wavelength range in which the target event can be determined is specified as a characteristic wavelength. In the example of FIG. 7, any wavelength of the wavelength range of 500 nm to 700 nm is specified as a characteristic wavelength. One characteristic wavelength or a plurality of characteristic wavelengths may be specified. As a method of specifying the characteristic wavelength, for example, a center wavelength of 600 nm within the wavelength range (500 nm to 700 nm) may be selected, or a wavelength at which a difference of the spectral intensity between spectra is largest may be selected. In addition, while it is recognized that a peak is formed on each spectral data at a wavelength of approximately 650 nm in FIG. 7, such a characteristic point may also be specified as the characteristic wavelength. This characteristic wavelength may also be different depending on the target event of the subject.

In addition, a characteristic wavelength range is set by centering this characteristic wavelength. The characteristic wavelength range is set to a predetermined wavelength range such as ±10 nm. For this reason, if the characteristic wavelength is set to 500 nm, and the characteristic wavelength range is set to ±10 nm, a range for actually detecting the spectral data becomes 495 to 505 nm. This characteristic wavelength range may be different depending on each target event of the subject.

In addition, the detection algorithm information may include various computation methods. In this case, the characteristic wavelength or the characteristic wavelength range is set as an explanatory variable $x1, x2, \ldots,$ and $xk$, and determination is performed using a response variable $y$ obtained by applying the explanatory variable to a computation formula. That is, a response variable "$y$" obtained from "$y=f(x1, x2, \ldots, xk)$" becomes the detection algorithm information. Similar to the characteristic wavelength or the characteristic wavelength range, individual explanatory variables $x1, x2, \ldots,$ and $xk$ included therein also are the detection algorithm information.

The algorithm database 3 stores the characteristic wavelength, the characteristic wavelength range, and a computation method or a computation formula itself as necessary for each reference target event of the subject in association with each other.

Figure 8:
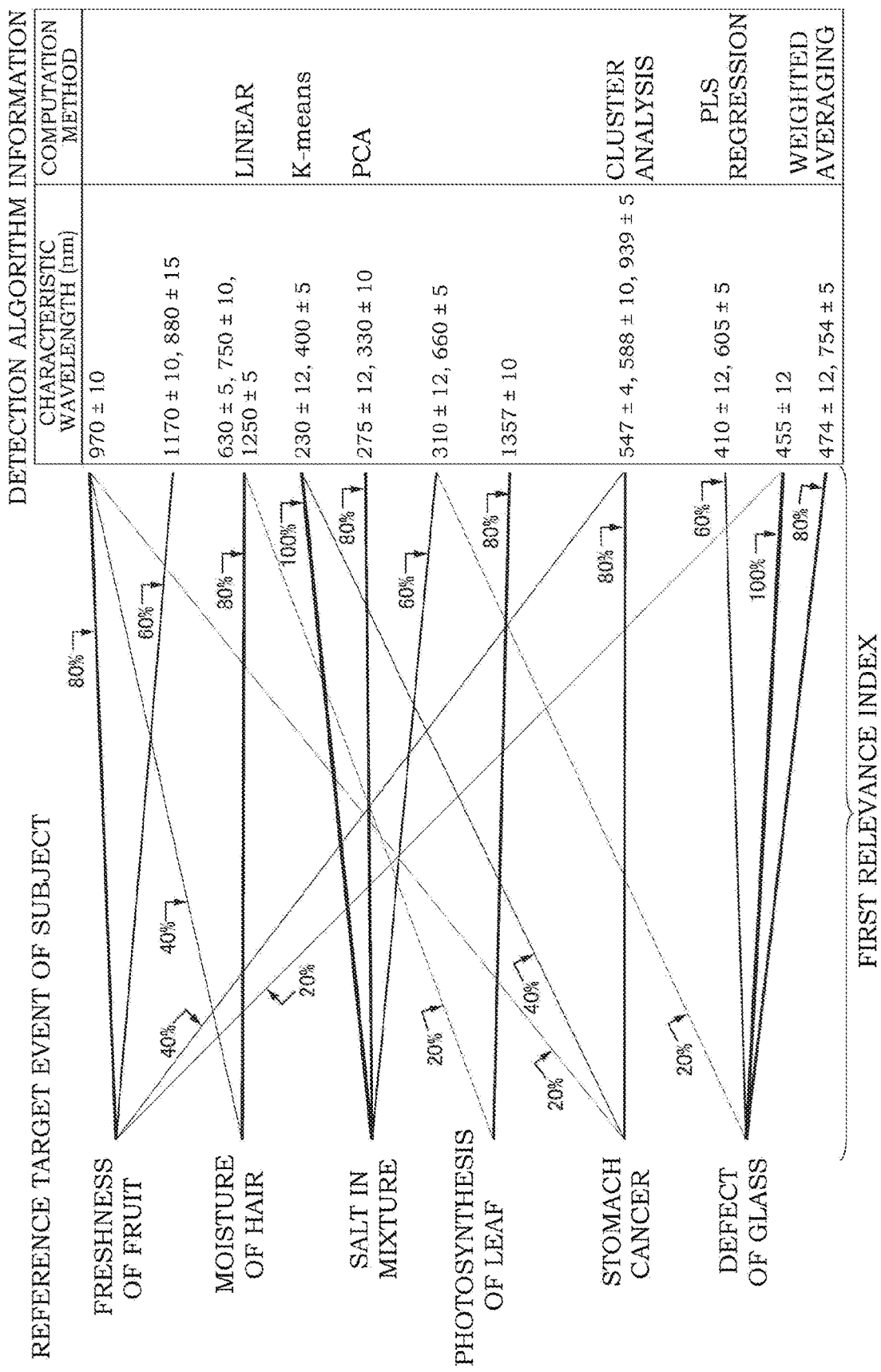
FIG. 8 is a diagram illustrating a network in which a reference target event of a subject and detection algorithm information are associated with each other using a first relevance index.

In this case, the algorithm database 3 may be defined on the basis of a first relevance index having three or more levels between the reference target event of the subject and the detection algorithm information. FIG. 8 illustrate a network in which the reference target event of the subject and the detection algorithm information are associated with each other using the first relevance index having three or more levels. For example, the freshness of fruit has a first relevance index of 80% for a case where the characteristic wavelength and the characteristic wavelength range as the detection algorithm information are set to "970±10 nm", has a first relevance index of 60% for the case of two wavelengths including "1170±10 nm" and "880±15 nm", has a first relevance index of 40% for a case where three wavelengths including "547±4 nm", "588±10 nm", "939±5 nm" are set as the detection algorithm information, and the computation method is set as a cluster analysis, and has a first relevance index of 20% for the case of "455±12 nm". The moisture of hair has a first relevance index of 80% for a case where the characteristic wavelength and the characteristic wavelength range as the detection algorithm information are set to three wavelengths including "630±5 nm", "750±10 nm", "1250±5 nm", and the computation method is set as "linear", and has a first relevance index of 20% for the case of "970±10 nm". The stomach cancer has a first relevance index of 20% for a case where the characteristic wavelength and the characteristic wavelength range as the detection algorithm information are set to "970±10 nm", has a first relevance index of 40% for a case where the detection algorithm information are set to two wavelengths including "230±12 nm" and "400±5 nm", and the computation method is set to "K-means", and has a first relevance index of 80% for a case where the detection algorithm information are set to three wavelengths including "547±4 nm", "588±10 nm", and "939±5 nm", and the computation method is set to "cluster analysis". A so-called neural network may also be employed to set the first relevance index.

The first relevance index represents congeniality of the detection algorithm information selected to determine the target event of the subject using the spectral image capturing device 4 or the photographing apparatus 5, in other words, accuracy of the detection algorithm information selected to determine the target event of the subject. In the aforementioned example, the congeniality is best when the detection algorithm for detecting freshness of fruit is set to "970±10 nm". This means that the determination can be performed with the highest effectiveness and precision. In detection of freshness of fruit, the congeniality level is sequentially set in order of the case of two wavelengths including "1170±10 nm" and "880±15 nm", the case where the detection algorithm information is set to three wavelengths including "547±4 nm", "588±10 nm" and "939±5 nm", and the computation method is set to "cluster analysis", and the case of "455±12 nm".

Figure 9:
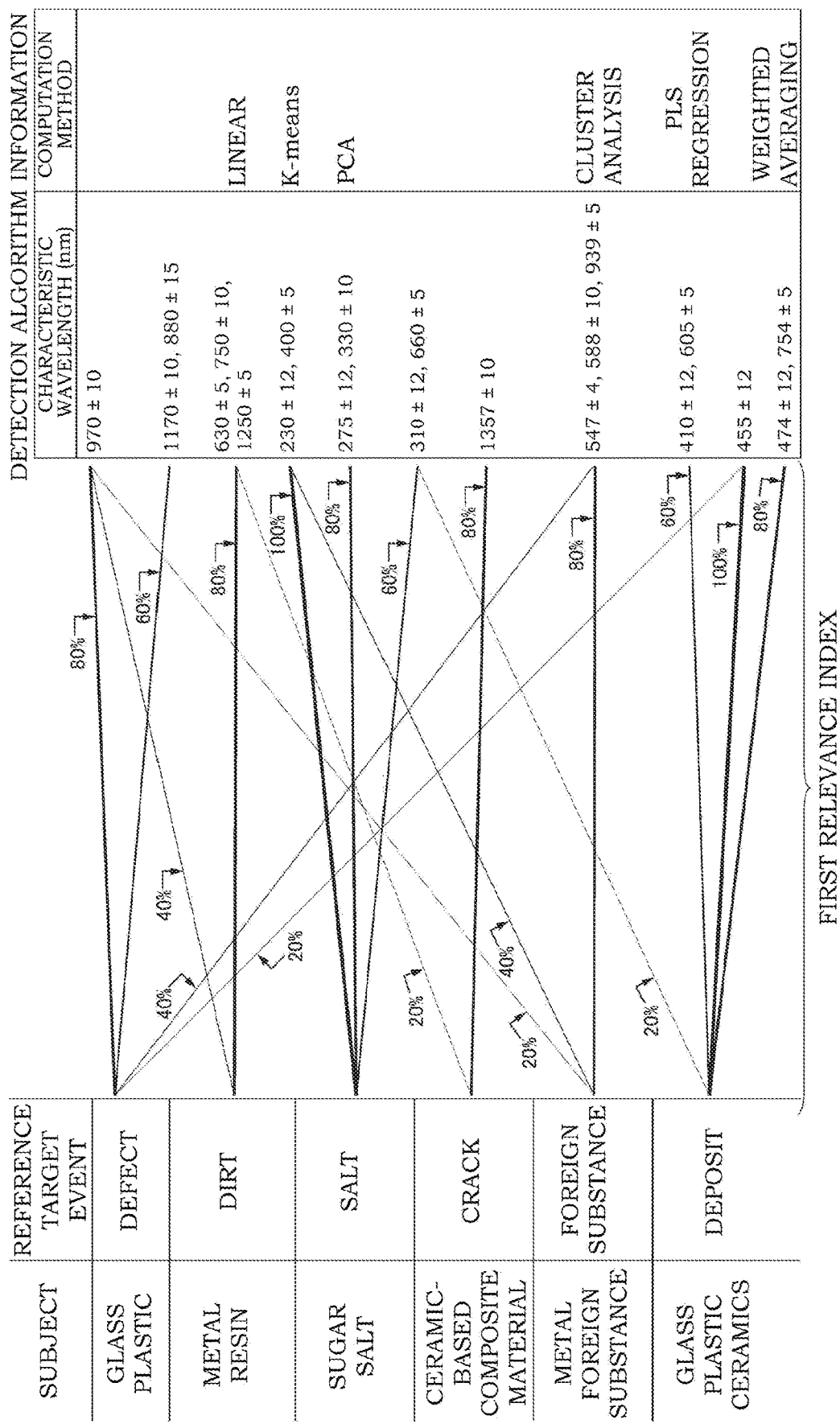
FIG. 9 is a diagram illustrating an example in which various parameters of an illumination system and an imaging system are associated in addition to the target event of the subject using the first relevance index.

A notation method of the target event of the subject is not limited to the aforementioned one. For example, as illustrated in FIG. 9, association using the first relevance index is performed even when the subject is a composite material formed of two or more materials. In the example of FIG. 9, a composite material formed by inserting a plastic material between glass plates is set as the subject, and a defect in the plastic material is set as the reference target event. This composite material may include a laminated body formed by laminating, for example, a plurality of metal layers and resin layers or a mixture formed by mixing different materials such as sugar and salt. Alternatively, the composite material may include an integrated body such as a ceramic-based composite material obtained by using ceramics as a base material and adding whiskers as a second layer.

Alternatively, a foreign substance contained in a composite material consisting of metal and the foreign substance may be set as the reference target event. In this example, one of elements of the composite material is set as the reference target event. Alternatively, the subject may include a composite material consisting of three or more materials such as glass, a plastic material, and ceramics. The reference target event is defined for each of these composite materials.

Even when the subject is formed of a composite material in this manner, the detection algorithm information is associated using the relevance index having three or more levels. If the subject is formed of a composite material containing metal and a foreign substance, the characteristic wavelength of the foreign substance in addition to the characteristic wavelength of the metal is also considered as the characteristic wavelength of the detection algorithm information, and this characteristic wavelength is associated using the relevance index by researching a condition suitable for extracting the reference target event from the subject in advance.

In the example in which the subject is formed of a composite material, for example, metal having a mixed crystal state around martensitic transformation may be set as the subject, and individual phase may be set as the reference target event. In addition, in a case where the subject itself is formed of a single-phase material instead of the composite material, but the single-phase material changes in a time-series manner, the changed phase may be set as the reference target event.

After step S13, the information search program selects the detection algorithm information one or more times from the character strings included in the target event of the subject extracted in step S12.

When the detection algorithm information is selected from the character string included in the target event of the subject extracted in step S12, the first relevance index between the reference target event of the subject and the detection algorithm information obtained in advance of FIG. 8 is referenced. For example, in a case where the target event of the subject extracted in step S12 is "leaf photosynthesis", and the first relevance index described above is referenced, "1357±10 nm" having a high first relevance index with the "leaf photosynthesis" is selected as the detection algorithm information. The case of "630±5 nm, 750±10 nm, and 1250±5 nm" and "linear" as the computation method where the first relevance index is low, but the relevance itself is recognized may also be selected as the detection algorithm information. Alternatively, other pieces of detection algorithm information to which no arrow is linked may also be selected.

In a case where the target event of the subject extracted in step S12 is "moisture of leaf", such an item does not exist as the reference target event of the subject. In this case, optimum detection algorithm information may be estimated from any one of the case of "1357±10 nm" having the high first relevance index with the "leaf photosynthesis" as the reference target event of the subject, the case of "630±5 nm, 750±10 nm, 1250±5 nm" and "linear" as the computation method, the case of "630±5 nm, 750±10 nm, 1250±5 nm" having the high first relevance index with the "moisture of hair" and "linear" as the computation method, and the case of "970±10 nm". In this case, for example, the common first relevance index "630±5 nm" may be estimated as the detection algorithm information of the "moisture of leaf", or all the characteristic wavelengths having the first relevance index of 40% or higher out of those associated with "leaf photosynthesis" and "moisture of hair" may be estimated as the detection algorithm information. In addition, a wavelength obtained by weighted averaging all the detection algorithms having the first relevance index of 0% or higher with the "leaf photosynthesis" and "moisture of hair" using the respective first relevance indexes may be estimated as the detection algorithm information.

When the target event of the subject extracted in step S12 is "cancer of tongue", such an item does not exist in the reference target event of the subject. Although the "stomach cancer" exists as a past target event of the subject regarding the "cancer", there is no reference target event of the subject regarding the "tongue". In this case, estimation may be performed on the basis of the past detection algorithm information of the "stomach cancer". If there is past detection algorithm information regarding "lip" which is close to the "tongue", estimation may be performed on the basis of the past detection algorithm information.

In a case where the subject extracted in step S12 is a mixture of sugar and salt, and the extracted target event is "salt", the case of "230±12 nm, 400±5 nm" as the wavelength and "K-means" as the computation method is preferentially selected as the detection algorithm information by referencing the first relevance indexes of FIG. 9.

In a case where the subject extracted in step S12 is, for example, "paper", and the extracted target event is "foreign substance", there is no subject matching this case even by referencing the first relevance indexes of FIGS. 8 and 9. However, the "foreign substance" as the reference target event exists in the case of a mixture of "metal" and "foreign substance" as the subject. In this case, the detection algorithm information having the low first relevance index for the case where a mixture "metal" and "foreign substance" is set as the subject, and the "foreign substance" is set as the reference target event may also be selected.

That is, selection of the detection algorithm information is not limited to a descending order case in which the higher first relevance index is selected with a higher priority. Instead, an ascending order in which the lower first relevance index is selected with a higher priority may also be possible. Alternatively, any other selection method based on a priority may also be employed.

The method of selecting the detection algorithm information for the target event of the subject extracted in step S12 is not limited to the aforementioned method. Instead, any other method may be employed as long as it references the first relevance index. In addition, the search operation of step S13 may be performed using artificial intelligence. In this case, the first relevance index may be regarded as a neural network.

Then, the process advances to step S14, and the selected detection algorithm information is displayed using the display unit 23. As a result, a user can immediately identify the detection algorithm information depending on a target event of the subject to be determined therefrom by visually recognizing the display unit 23.

A user sets the detection algorithm of the image processing unit 484 in the spectral image capturing device 4 or the detection algorithm of the photographing apparatus 5 on the basis of the output detection algorithm information. In this setting of the detection algorithm, a color operation process (hereinafter, referred to as "characteristic wavelength computation") based on the characteristic wavelength is performed in addition to the characteristic wavelength and the characteristic wavelength range. For example, in a case where the target event of the subject is "leaf photosynthesis", and "1357±10 nm" is selected as the detection algorithm, the spectral image capturing device 4 or the photographing apparatus 5 is set such that characteristic wavelength computation for displaying red is performed for pixels included in this wavelength range, and the characteristic wavelength computation for displaying white is performed for a pixel not included in this wavelength.

As a result, by photographing "leaf" as a subject using the spectral image capturing device 4 or the photographing apparatus 5, it is possible to detect spectral data necessary for determining "photosynthesis" as the target event and display it using a color analysis image.

In particular, according to the present invention, it is possible to easily acquire optimum detection algorithm information of spectral data depending on a target event of the subject to be determined therefrom by the spectral image capturing device 4 or the photographing apparatus 5. It is possible to reduce a burden of labor for researching an optimum detection algorithm and thus shorten time whenever a new target event of the subject is sequentially generated.

The information search system 1 according to the present invention is characterized in that optimum detection algorithm information is searched using the first relevance index set in three or more levels. The first relevance index may be described, for example, using a numerical value of 0 to 100%. However, the invention is not limited thereto. The first relevance index may be described in any number of levels as long as it can be described using a numeral value having three or more levels.

Since the search operation is performed on the basis of the first relevance index expressed as a numerical value having three or more levels in this manner, the detection algorithm information may be searched and displayed in a descending order of the first relevance index when a plurality of pieces of detection algorithm information are selected. If the detection algorithm information is displayed for a user in a descending order of the first relevance index, a user may be urged to select detection algorithm information having a higher possibility with a higher priority. Meanwhile, even detection algorithm information having a lower first relevance index may be displayed as a second opinion. This is useful when the analysis is not easy using the first opinion.

In addition, according to the present invention, it is possible to determine the detection algorithm information having a significantly low first relevance index such as 1% without missing. Therefore, it is possible to allow a user to pay attention to a fact that even detection algorithm information having a significantly low first relevance index is linked to an insignicant indication and may be useful as the detection algorithm information once in several tens or hundreds of times.

According to the present invention, since the search operation is performed on the basis of the first relevance index having three or more levels in this manner, it is possible to select the search strategy by setting a threshold value advantageously. If the threshold value is set to be lower, it is possible to catch the detection algorithm information without missing even when the first relevance index described above is 1%. However, the detection algorithm information having a low possibility of suitably detecting the target event of the subject may be selected frequently in some cases. In comparison, if the threshold value is set to be higher, it is possible to narrow only the detection algorithm information having a high possibility of suitably detecting the target event of the subject. However, a photographing condition that may be suitable once in several tens or hundreds of times may be overlooked in some cases. Which one is emphasized may be decided from the viewpoint of a user side or a system side. However, it is possible to improve a degree of freedom for selecting such an emphasis point.

According to the present invention, the first relevance index described above may be updated. That is, the reference target event of the subject and the detection algorithm information illustrated in FIG. 8 are updated as necessary. This updating may be performed to reflect information provided via a public communication network such as the Internet. When new knowledge about a relationship between the reference target event of the subject and the detection algorithm information is found through site information or writings obtainable from the public communication network, the first relevance index increases or decreases depending on the knowledge. For example, when a fact that a detection algorithm having a certain level of the first relevance index for a certain reference target event of the subject can detect the target event with high precision is cited many times via the sites of the public communication network, the first relevance index set therebetween further increases. In addition, when a fact that a detection algorithm having a certain level of the first relevance index for a certain reference target event of the subject does not detect the target event well with high precision is cited many times via the sites of the public communication network, the first relevance index set therebetween decreases. In addition, when a fact that a certain reference target event of the subject can be detected with high accuracy using a detection algorithm that has not existed so far is cited via the sites of the public communication network, the updating may be performed by setting a new first relevance index therebetween.

The first relevance index may be updated on the basis of information obtainable from the public communication network. In addition, the updating may be performed artificially or automatically by the system side or the user side on the basis of the contents of research data, papers, conference presentations, newspaper articles, books, or the like by experts. Artificial intelligence may also be utilized in this updating processing.

Note that the invention is not limited to the aforementioned embodiments. The detection algorithm information may be searched by inputting the target event of the subject, information on the illumination light described above, various parameters of the imaging system, and parameters of hardware as the information to be input in step S11.

The search apparatus 2 may search the photographing condition to be provided to the photographing apparatus 5. The information search program searches a photographing condition having a high relevance index with the acquired target event. Before this search, the algorithm database 3 acquires the second relevance index between the reference target event and the photographing condition in advance as illustrated in FIG. 10.

Here, the "photographing condition" includes information on the illumination light such as a wavelength, an irradiation angle, and a luminance of illumination light used in photographing of the spectral image capturing device 4 or the photographing apparatus 5, and a condition of a polarization filter provided in the illumination light, and various parameters of the imaging system or hardware such as an F-number of the spectral image capturing device 4 or the photographing apparatus 5, a numerical aperture (NA) and a focal length of the lens, a model of use, a wavelength resolution, a spatial resolution, sensitivity to each spectral wavelength, exposure time, auto focus time, a shutter speed, a shutter type, a white balance, a black balance, a gain, and the like. Each parameter described above may be added to the detection algorithm information in addition to the characteristic wavelength, the characteristic wavelength range, and the computation method described above. Furthermore, each parameter described above may be defined as a condition for obtaining the characteristic wavelength or the characteristic wavelength range described above.

When such various photographing conditions are associated using the second relevance indexes, the wavelength resolution may be ranked into some groups such as "96 to 120 dpi", "120 to 144 dpi", and "144 to 192 dpi", and the first relevance index may be associated with each rank.

For example, such a photographing condition is set as "white balance XX", a combination of "lens arrangement P" and "filter W", "filter Q", a combination of "filter R" and "illumination light angle XX°", a combination of "filter S" and "spatial resolution 133-140 dpi", "exposure time of XX ns or longer", "exposure time shorter than XX ns", or the like as illustrated in FIG. 10.

The photographing condition may include a plurality of factors in combination or may include a single factor. The photographing condition such as "exposure time" may be classified into "exposure time of XX ns or longer" and "exposure time shorter than XX ns", and then, a second relevance index may be associated with each of the factors. Furthermore, a specific condition may be allocated to each factor. For example, "filter Q" may have a filter transmission wavelength of 600 to 650 nm or the like. For example, "filter R" may have a filter transmission wavelength of 340 to 400 nm or the like. For example, "filter S" may have a filter transmission wavelength of 1000 to 1100 nm or the like.

The reference target event of the subject and the photographing condition are associated with each other using the second relevance index. For example, "freshness of fruit" is associated with "filter Q" at a second relevance index of 80%, and is associated with "white balance XX" at a second relevance index of 20%. The "moisture of hair" is associated with a combination of "filter S" and "spatial resolution of 133 to 140 dpi" at a second relevance index of 100%, and is association with a combination of "lens arrangement P" and "filter W" at a second relevance index of 40%. The "leaf photosynthesis" is associated with "white balance XX" at a second relevance index of 60%, and is associated with "exposure time shorter than XX ns" at a second relevance index of 20%. The "stomach cancer" is associated with a combination of "lens arrangement P" and "filter W" at a second relevance index of 80%, and is associated with "filter S" and "spatial resolution of 133 to 140 dpi" at a second relevance index of 40%. The "defect of glass" is associated with "filter R, illumination light angle of XX°" at a second relevance index of 100%, and is associated with "exposure time of XX ns or longer" at a second relevance index of 20%.

The second relevance index refers to congeniality of the photographing condition of the photographing apparatus 5 in determination based on each reference target event. In other words, the second relevance index indicates accuracy of the design or the photographing method of the photographing apparatus 5 for the reference target event and further the target event of the subject determined using it. In the aforementioned example, a combination of "lens arrangement P" and "filter W" has best congeniality as a photographing condition for the "stomach cancer" and further indicates that it is possible to perform determination with highest effectiveness and precision. It is recognized that the photographing condition for "stomach cancer" is linked to "filter S" and "spatial resolution of 133 to 140 dpi".

The algorithm database 3 stores each photographing condition described above in association with the reference target event described above using the second relevance index.

The information search program may reference the second relevance index of FIG. 10 in order to search a photographing condition having higher congeniality with a newly input target event. For example, in a case where the newly input target event is "moisture of hair", and the second relevance indexes described above are referenced, "filter S" and "spatial resolution of 133 to 140 dpi" having a high second relevance index with the reference detection algorithm information corresponding thereto are selected as the photographing condition. A combination of "lens arrangement P" and "filter W", where the second relevance index is low, but the relevance itself is recognized, may also be selected as the photographing condition. Similarly, when the newly input target event is the "stomach cancer", a combination of "lens arrangement P" and "filter W" is selected.

Similarly, in the embodiment of FIG. 10, selection of the photographing condition is not limited to a descending order case in which the higher second relevance index is selected with a higher priority. The photographing condition may be selected in an ascending order starting from the lower second relevance index case by case, or any other selection method based on a priority may also be employed.

Figure 11:
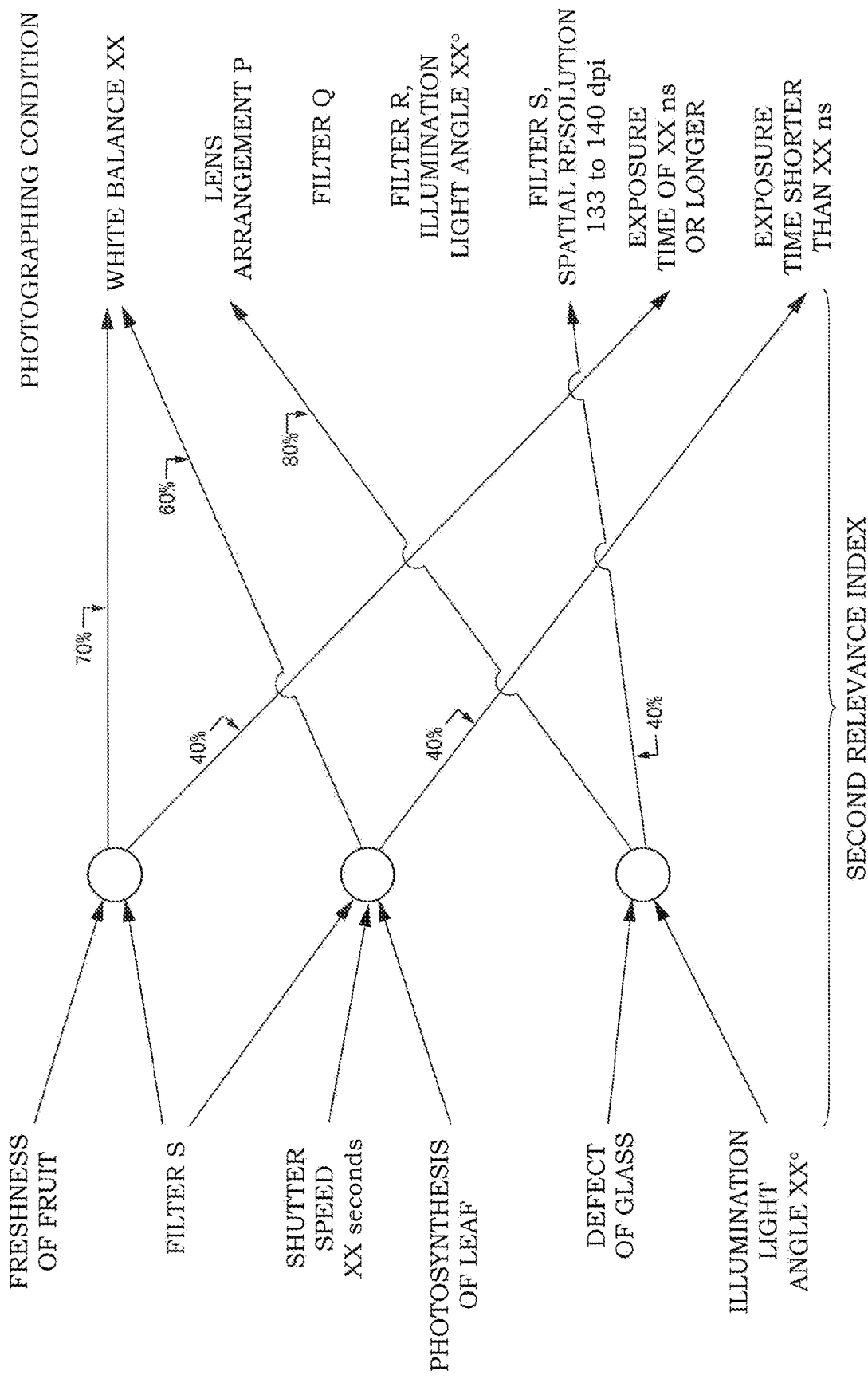
FIG. 11 is a diagram illustrating a network in which reference target events of a subject, reference photographing conditions, and photographing conditions are associated with one another using the second relevance index.

FIG. 11 illustrates an example in which the photographing condition is associated with a combination of the reference target event and the reference photographing condition using the second relevance index having three or more levels. The reference photographing condition includes the same items as those of the aforementioned photographing condition. In the second relevance index of FIG. 11, a part of the photographing conditions in addition to the target event are input as known information using the manipulation unit 25. That is, while a part of the target events and the photographing conditions are already decided, it is difficult to decide the remaining photographing conditions. Therefore, the search operation is performed using the second relevance index.

Referring to FIG. 11, the reference target events or the reference photographing conditions are arranged in the left side using the second relevance index, and the photographing conditions to be actually searched are arranged in the right side using the second relevance index.

In a case where the reference target event is set to "freshness of fruit", and the reference photographing condition is set to "filter S", a node corresponding to a combination of them has a first relevance index of 70% with "white balance XX" and has a second relevance index of 40% with "exposure time of XX ns or longer". In addition, in a case where the reference photographing condition is set to "filter S" and "shutter speed of XX seconds", and the reference target event is "leaf photosynthesis", a node corresponding to a combination of them has a second relevance index of 60% with "white balance XX", and has a second relevance index of 40% with "exposure time shorter than XX ns".

If such second relevance indexes are stored in advance, it is possible to search a photographing condition by referencing the second relevance index when the known target event and the photographing condition are input through the manipulation unit 25. For example, in a case where "defect of glass" is input as the target event through the manipulation unit 25, and "illumination light angle of XX°" is input as the photographing condition, "lens arrangement", "filter S, spatial resolution of 133 to 140 dpi", or the like having a relevance index defined for a node corresponding to a combination of them is suitably selected.

After selecting them, the information search program displays the selected photographing condition on the display unit 23 of the search apparatus 2. As a result, a user can immediately recognize the photographing condition depending on the detection algorithm information by watching the display unit 23. Similarly, artificial intelligence may also be employed in such a search operation of the photographing condition. That is, the second relevance index may be configured using a neural network.

A user designs each of the imaging optical system 51, the filter 52, the image capturing element 53, the signal processing unit 54, and the like of the photographing apparatus 5 on the basis of the output photographing condition, sets the condition of the illumination light, or decides various conditions regarding the photographing. In addition, a user designs each configuration of the spectral image capturing device 4 or decides each condition on the basis of the output photographing condition.

In the course of inputting the known photographing condition, for example, the known photographing condition may be automatically extracted instead of being input using the manipulation unit 25. Means for extracting the photographing condition may include, for example, a device capable of reading electronic data or information disclosed on the Internet regarding manuals of the employed spectral image capturing device 4 or photographing apparatus 5 using a text mining technology and analyzing it, or may include a PC or the like. Information regarding the photographing condition may be extracted from the analyzed information and may be input as the known photographing condition described above. In addition, in a case where the exposure time is extracted as the known photographing condition, a device for measuring actual exposure time of the spectral image capturing device 4 or the photographing apparatus 5 may be used, or the spectral image capturing device 4 or the photographing apparatus 5 may be directly connected to the PC to read the set exposure time.

Figure 12:
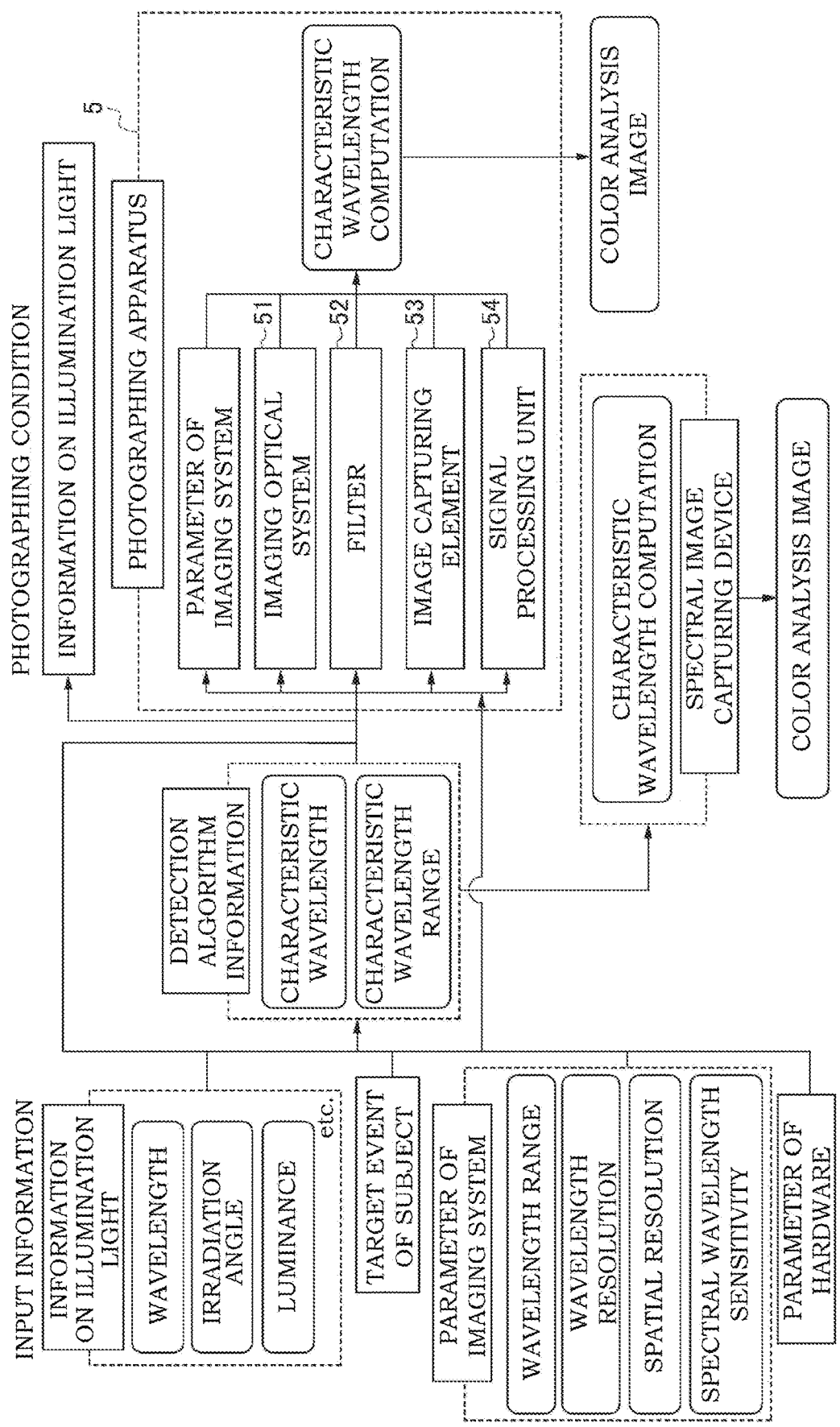
FIG. 12 is a data flow diagram until a photographing condition of the photographing apparatus is acquired starting from an input of the target event of the subject.

FIG. 12 illustrates a data flow until a photographing condition of the photographing apparatus 5 is acquired starting from the input of the target event of the subject.

The input information includes, in addition to the target event of the subject, parameters of the illumination system such as a wavelength of the illumination light, an irradiation angle of the illumination light irradiated onto the subject, and a luminance of the illumination light, parameters of the imaging system such as a wavelength range of the spectral image capturing device 4 or the photographing apparatus 5, a wavelength resolution, a spatial resolution, a spectral wavelength sensitivity, and a polarization filter, or the like. In addition, parameters of hardware may also be input. The detection algorithm information or the photographing condition such as the characteristic wavelength or the characteristic wavelength range is searched by referencing the first relevance index described above on the basis of the input information. The detection algorithm information obtained in this manner is used to select algorithm information or a photographing condition most suitable for photographing the subject using the spectral image capturing device 4 or the photographing apparatus 5 by referencing the past data stored in the algorithm database 3 on the basis of the parameters of the illumination system and the parameters of the imaging system in addition to the input target event of the subject.

The subject is photographed by the spectral image capturing device 4 or the photographing apparatus 5 where the detection algorithm information is set, so that the characteristic wavelength computation is performed. As a result, it is possible to obtain a color analysis image subjected to the computation.

Note that the invention is not limited to the aforementioned examples. Under the assumption that the first relevance index described above is acquired, an input of the detection algorithm information may be received instead of receiving an input of the target event of the subject in step S11. In addition, in step S13, the target event of the subject is searched in reverse by referencing the first relevance index described above on the basis of the received detection algorithm information. That is, the input/output relationship of FIGS. 8 and 9 is exchanged with the aforementioned example, so that the detection algorithm information is set as an input, and the target event of the subject is set as an output.

As an application example of this aspect, for example, in a case where an unknown subject is photographed by the spectral image capturing device 4 or the photographing apparatus 5, and as a result, the characteristic wavelengths are 310 nm and 660 nm, it is possible to determine that salt of a mixture is highly likely the target event of the subject.

Figure 13:
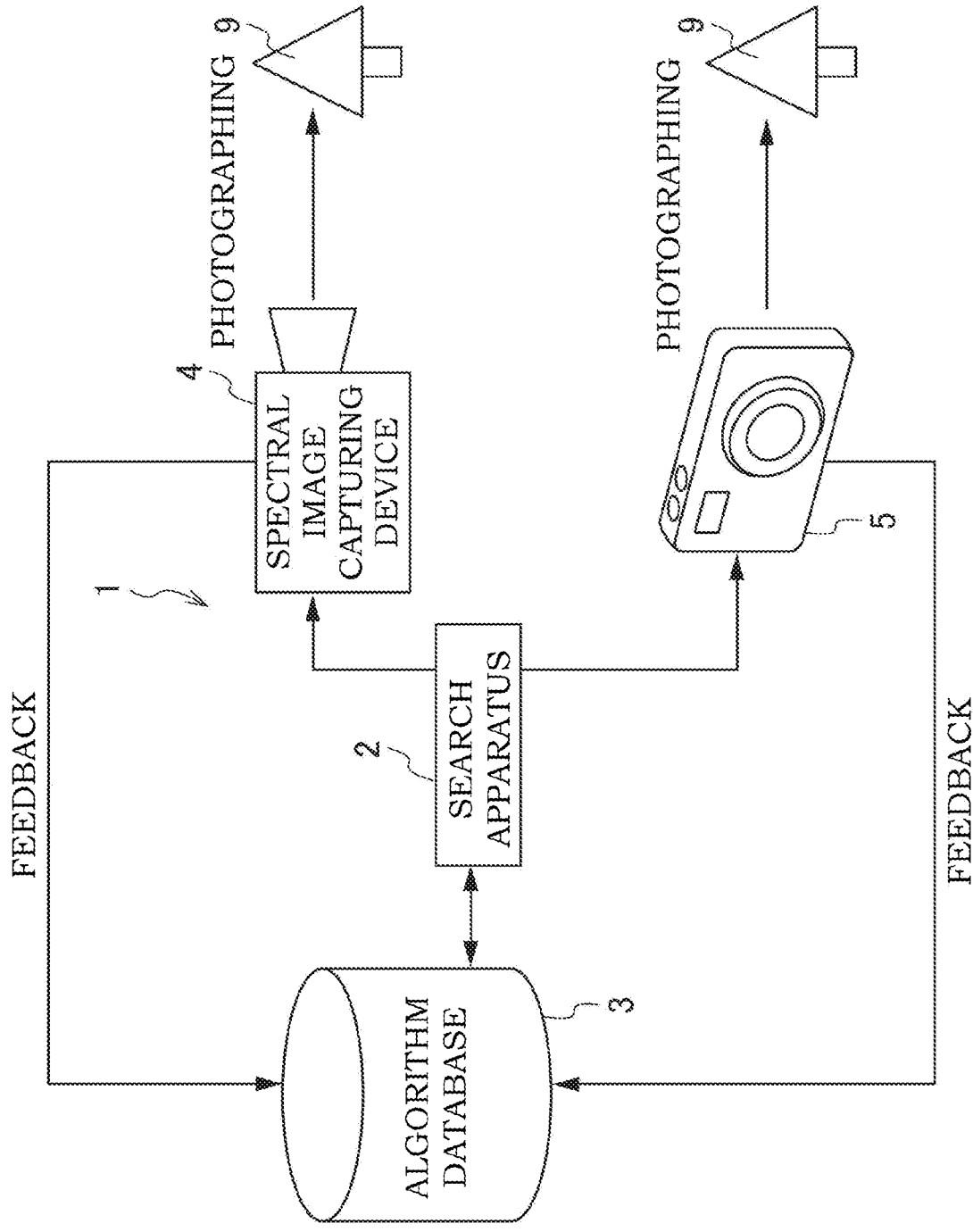
FIG. 13 is a diagram illustrating an exemplary information search system having a feedback loop.

The information search system 1 according to the present invention may have, for example, a feedback loop of FIG. 13.

In this feedback loop, the algorithm database 3 receives information from the spectral image capturing device 4 or the photographing apparatus 5 obtained by photographing the subject 9.

The spectral image capturing device 4 or the photographing apparatus 5 acquires detection algorithm information searched on the basis of the method descried above using the search apparatus 2. In addition, the spectral image capturing device 4 or the photographing apparatus 5 actually photographs the subject 9 on the basis of this detection algorithm information. The subject 9 as a photographing target corresponds to the subject 9 input in step S11, and its photographing object is to detect a target event input in step S11. That is, it is assumed that detection of leaf photosynthesis is input as a target event of the subject in step S11 as described above, and the detection algorithm searched in step S13 is suitable for detecting the leaf photosynthesis. In this case, the searched detection algorithm is input to the spectral image capturing device 4 or the photographing apparatus 5. In addition, a leaf as the subject 9 is photographed using the spectral image capturing device 4 or the photographing apparatus 5 on the basis of the input detection algorithm to try to detect the photosynthesis.

The spectral image capturing device 4 or the photographing apparatus 5 transmits the spectral data obtained by photographing the subject 9 to the algorithm database 3. The algorithm database 3 updates the first relevance index on the basis of the spectral data.

For example, as illustrated in FIG. 8, for leaf photosynthesis as a target event of the subject 9, a detection algorithm having a characteristic wavelength of 1357±10 nm is searched. If the spectral data obtained by actually photographing a leaf as the subject 9 on the basis of the searched detection algorithm suitably expresses the leaf photosynthesis, it is determined that this' detection algorithm is suitable, and the first relevance index used to search this has high accuracy. Therefore, updating is not particularly performed. In comparison, if the obtained spectral data does not suitably express the leaf photosynthesis, it is determined that this detection algorithm is not suitable, and it is necessary to improve accuracy of the first relevance index used to search this. Therefore, updating is performed.

Note that the first relevance index of FIG. 8 may be formed on the basis of unsupervised learning without limiting to so-called supervised learning in which learning is performed by inputting the known reference target event of the subject and the detection algorithm. In this case, the obtained data may be classified by clustering, and the first relevance index may be created on the basis of the classification of the obtained data.

Whether or not the leaf photosynthesis as the target event is suitably expressed may be determined, for example, on the basis of the spectral data. In this case, the determination may be made on the basis of spectral intensities of each wavelength region.

Figure 14A:
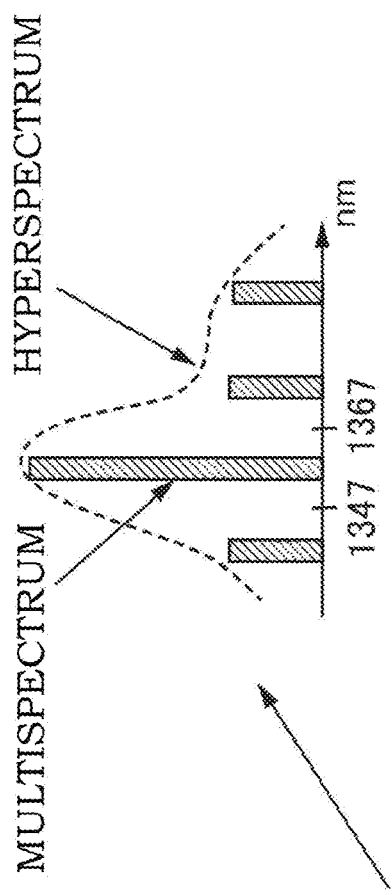
FIGS. 14A-14C are diagrams illustrating an example for determining a target event on the basis of the spectral data.

As illustrated in FIG. 14A, as a detection algorithm, a case where whether or not there is photosynthesis is determined on the basis of the spectral intensity in a wavelength range of 1347 to 1367 nm will be described by way of example.

Figure 14B:
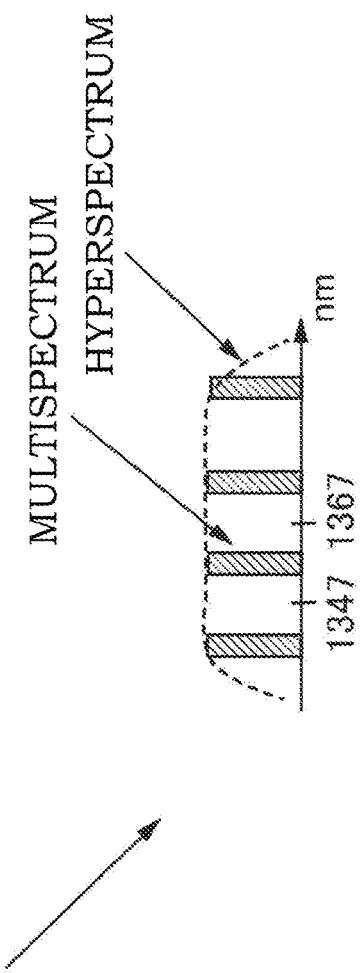
Figure 14C:
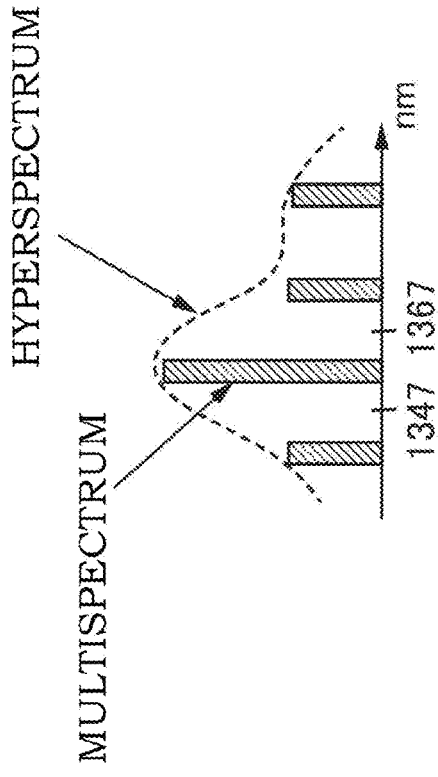

Here, as a result of photographing the leaf as the subject using the photographing apparatus 5, for example, relatively many photosynthesis are detected, and a spectrum peak is high in a wavelength range of 1347 to 1367 nm as illustrated in FIG. 14B in some cases. In addition, as illustrated in FIG. 14C, photosynthesis is not detected so many, and the spectrum peak is not high within a wavelength range of 1347 to 1367 nm in some cases.

How to analyze the height of the detected peak obtained in this manner may be set freely depending on a system side. For example, it may be determined that photosynthesis is detected if a peak of the spectrum exceeds a certain threshold value within a wavelength range of 1347 to 1367 nm. Otherwise, if the peak is equal to or lower than a certain threshold value, it may be determined that no photosynthesis is detected. In addition to this determination, the relevance index described above may be updated. As a rule for updating the relevance index, the updating may be performed on the basis of the detected spectral intensity. If it is analyzed that photosynthesis is more suitably detected as a target event as the spectral intensity of the wavelength range set as the detection algorithm increases, the first relevance index linked to this detection algorithm is updated to increase. For example, out of the first relevance indexes of FIG. 8, the detection algorithm for detecting the leaf photosynthesis has the highest first relevance index at a wavelength range of 1347 to 1367 nm (1357±10 nm). As a result of detection of the subject based on this detection algorithm (1347 to 1367 nm), if the peak within this wavelength range of the detection algorithm exceeds a certain threshold value as illustrated in FIG. 14B, it is determined that the target event can be accurately detected using this detection algorithm, and the first relevance index (80%) linked to this detection algorithm is updated to further increase. In comparison, as a result of detection of the subject based on this detection algorithm (1347 to 1367 nm), if the peak within this wavelength range of the detection algorithm is equal to or lower than a certain threshold value as illustrated in FIG. 14C, it is determined that it is difficult to accurately detect the target event using this detection algorithm, and the first relevance index (80%) linked to this detection algorithm is updated to further decrease.

The detected spectral intensity heavily depends on whether or not the target event of the subject is exhibited. In the aforementioned example, it is recognized that the spectral intensity depends on whether or not the leaf as the subject exhibits the photosynthesis as the target event.

However, in addition to whether or not the target event is exhibited, the spectral intensity is also influenced by suitability of the detection algorithm for detecting the target event of the subject. It would be sufficiently anticipated that the spectral intensity decreases if the detection algorithm for detecting the target event of the subject is not suitable or has low suitability, compared to a case where the suitability is high. If the spectral intensity is different regardless of whether or not the leaf as the subject exhibits photosynthesis at the same level, it is obvious that the spectral intensity is influenced by the suitability of the detection algorithm.

Note that, if the spectral intensity decreases within such a wavelength range of the detection algorithm, the spectral intensities in the other wavelength ranges may increase reversely. In addition, if the detection algorithm for detecting the target event of the subject is suitable or has high suitability, the spectral intensity within the wavelength range of the detection algorithm decreases reversely in some cases. Similarly, if the suitability is low, the spectral intensity within that wavelength range may increase in some cases.

That is, the spectral intensity within the wavelength region of the detection algorithm or the spectral intensities in other wavelength regions are influenced depending on suitability between the target event of the subject and the detection algorithm. According to the present invention, the first relevance index is updated depending on the spectral intensity exhibited by this influence. As a result, suitability between the target event of the subject and the detection algorithm is gradually improved using the first relevance index which is sequentially updated.

In addition to the suitability between the target event of the subject and the detection algorithm, characteristics of the image of the photographed subject itself (that is, a shape of the subject visualized on the image, texture, contrast, location, and the like) are also reflected on this spectral data.

For example, as illustrated in FIG. 15, each pixel P1 and P2 of the image obtained by photographing the subject 11 using the spectral image capturing device 4 or the photographing apparatus 5 has respective spectral data. The suitability between the target event of the subject and the detection algorithm and the image characteristic amount of the photographed subject itself is reflected on each spectral data. For example, since the pixel P1 is located in an edge of the image, influence of the image characteristic amount is remarkably reflected on the spectral data. In addition, since the leaf photosynthesis as the target event of the subject is not generated in the pixel P1, influence of the leaf photosynthesis is not remarkably reflected on the spectral data. Meanwhile, since the pixel P2 is not located in an edge of the image, influence of the image characteristic amount is not remarkably reflected on the spectral data. In addition, since the leaf photosynthesis as the target event of the subject is generated in the pixel P2, influence of the leaf photosynthesis is remarkably reflected on the spectral data. Furthermore, both respective spectral data of the pixels P1 and P2 are influenced by the suitability with the detection algorithm.

That is, the spectral data is influenced by, spatial information such as a shape of the subject visualized on the image, texture, contrast, and location as well as such an image characteristic amount. For this reason, in execution of the aforementioned processing operation based on the spectral data, the suitability between the target event of the subject and the detection algorithm and the spatial information are dominant factors of the spectral data.

In particular, according to the present invention, considering a relationship between this spatial information and the image characteristic amount, the suitability between the target event of the subject and the detection algorithm may be determined, or the first or second relevance index may be updated.

Although the aforementioned embodiment has been described by exemplifying a multispectrum case, this may similarly apply to a hyperspectrum case. While the hyperspectrum is illustrated as dotted lines in FIGS. 14A-14C, the first relevance index may be updated for this hyperspectrum on the basis of the spectral intensity on the ordinate. In this case, the hyperspectrum photographed by the spectral image capturing device 4 may be acquired. In addition, the multispectrum obtained by the photographing apparatus 5 may be restored to hyperspectrum, and the suitability may be determined on the basis of this hyperspectrum. The restoration from the multispectrum to the hyperspectrum may be performed, for example, on the basis of a predetermined restoration algorithm using the search apparatus 2 or the like. This restoration algorithm may include a template based on a matching relationship between the hyperspectrum and the multispectrum, and this may be read and referenced for restoration as necessary.

Figure 16:
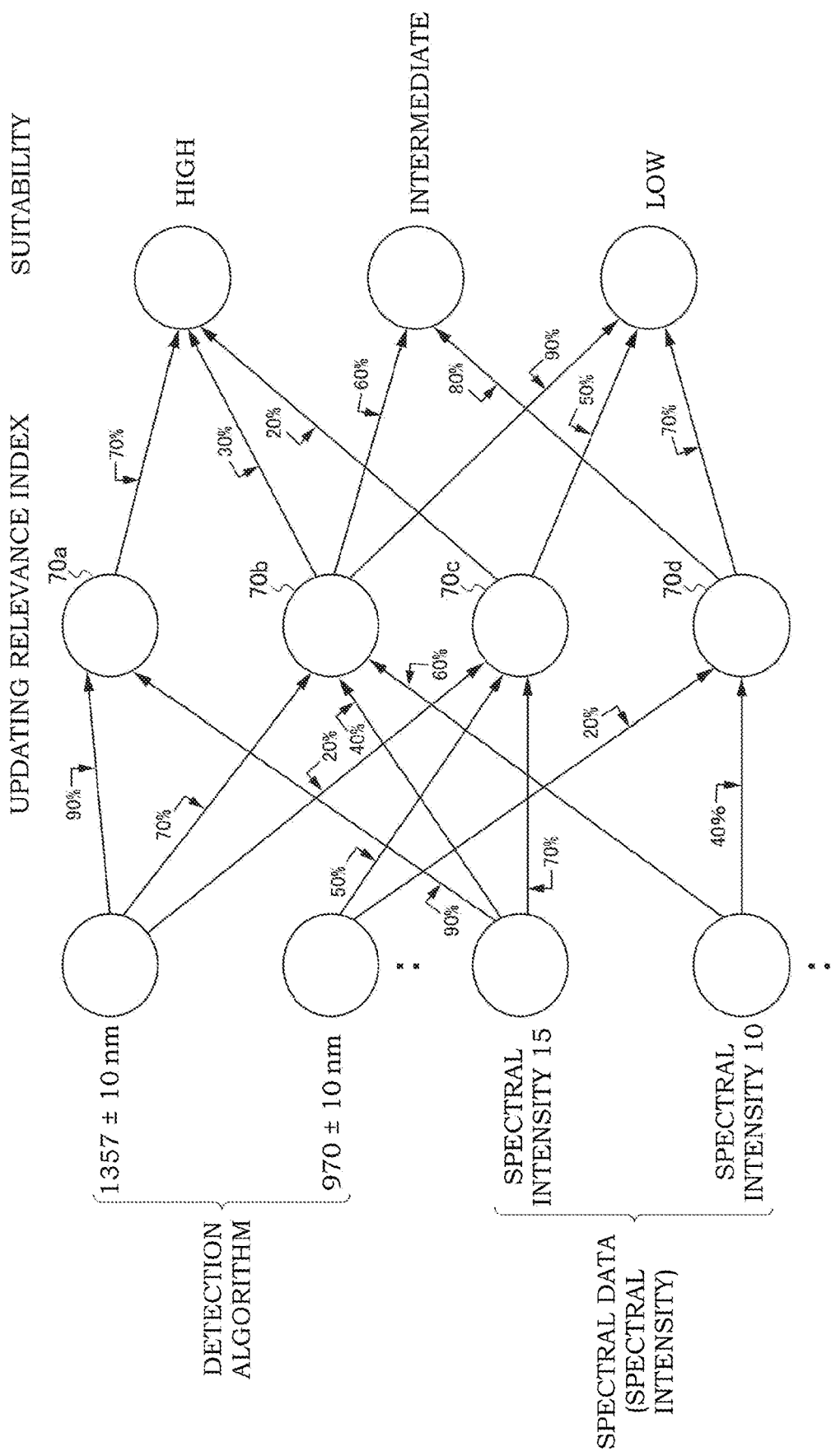
FIG. 16 is a diagram illustrating an example for performing an updating processing of the first relevance index on the basis of an updating relevance index.

Such an updating processing may be performed, for example, on the basis of an updating relevance index as illustrated in FIG. 16. For this updating relevance index, the currently set detection algorithm and the spectral data obtained by photographing the subject are set in the left side, and the aforementioned suitability is set in the right side while the node 70 is interposed therebetween.

The node 70 includes a combination of the currently set detection algorithm and the obtained spectral data (spectral intensity). In addition, the node 70 is respectively linked to the suitability as an output solution. Similarly, the updating relevance index is also a relevance index having three or more levels.

Such an updating relevance index is obtained in advance. In addition, the suitability as an output solution is searched on the basis of the currently set detection algorithm and the actually obtained spectral intensity by referencing the updating relevance index. A specific search method is similar to that of the first relevance index described above.

Here, in a case where the spectral intensity obtained by photographing the subject using the currently set detection algorithm (1375±10 nm) is "10", the node 70b matches, so that the node 70b has "low" suitability where the updating relevance index is highest. In this case, it is determined that the detection algorithm "1375±10 nm" has low suitability from the viewpoint of the acquired spectral intensity. In addition, the first relevance index of FIG. 8 is reset to decrease.

If the node 70a matches, the suitability is "high" where the updating relevance index is highest. In this case, the detection algorithm "1375±10 nm" has high suitability from the viewpoint of the acquired spectral intensity. In addition, the first relevance index of FIG. 8 is reset to increase. In addition, the relevance index may not necessarily be selected as a higher one, but may be selected as a lower one as long as it is based on the updating relevance index.

Note that, while the search solution is searched on the basis of the detected spectral intensity by way of example in the aforementioned embodiments, the search may be performed on the basis of any factor as long as it is based on the spectral data.

According to the present invention, a detection algorithm other than the currently set detection algorithm of FIG. 16 may also be input. In addition, the search solution may be obtained by inputting the other detection algorithm and the spectral data obtained through photographing based on the other detection algorithm.

The aforementioned feedback loop may also apply to the second relevance index.

The spectral image capturing device 4 or the photographing apparatus 5 acquires the photographing condition searched on the basis of the aforementioned method using the search apparatus 2. In addition, the spectral image capturing device 4 or the photographing apparatus 5 actually photographs the subject 9 on the basis of this photographing condition. The subject 9 as the photographing target corresponds to the subject 9 input in step S11, and its photographing object is to detect the target event input in step S11. That is, the detection algorithm searched in step S13 by inputting detection of leaf photosynthesis as a target event of the subject in step S11 described above is suitable for detecting the leaf photosynthesis. In this case, the searched photographing condition is input to the spectral image capturing device 4 or the photographing apparatus 5. In addition, a leaf as the subject 9 is photographed using the spectral image capturing device 4 or the photographing apparatus 5 on the basis of the input photographing condition to try to detect photosynthesis.

The spectral image capturing device 4 or the photographing apparatus 5 transmits the spectral data obtained by photographing the subject 9 to the algorithm database 3. The algorithm database 3 updates the second relevance index on the basis of this spectral data.

For example, as illustrated in FIG. 10, for the leaf photosynthesis as a target event of the subject 9, a photographing condition "white balance XX" is searched. If the spectral data obtained by actually photographing a leaf of a tree as the subject 9 on the basis of the photographing condition suitably expresses the leaf photosynthesis of the tree, it is determined that this photographing condition is appropriate, and the second relevance index used to search this photographing condition has high accuracy. Therefore, updating is not particularly performed. Meanwhile, if the obtained spectral data does not suitably express the leaf photosynthesis of the tree, it is determined that the photographing condition is not appropriate, and it is necessary to improve accuracy of the second relevance index used to search this photographing condition. Therefore, updating is performed.

Whether or not the leaf photosynthesis as a target event is suitably expressed may be determined, for example, on the basis of the spectral data. In this case, similar to the first relevance index, the determination may be performed on the basis of the spectral intensities of each wavelength region.

Alternatively, the second relevance index may be updated, and as a rule of the updating, the updating may be performed on the basis of the detected spectral intensity. Assuming that it is analyzed that the photosynthesis as a target event is more suitably detected as the spectral intensity is higher, the updating is performed such that the second relevance index linked to this photographing condition increases. For example, out of the second relevance indexes of FIG. 10, "white balance XX" as the photographing condition for detecting the leaf photosynthesis has the highest second relevance index. If the spectral intensity exceeds a certain threshold value as a result of detecting the subject on the basis of this photographing condition (white balance XX), it is determined that the target event can be accurately detected on the basis of this photographing condition, and the second relevance index (80%) linked to this photographing condition is updated to further increase. Meanwhile, if the spectral intensity is equal to or lower than the certain threshold value as a result of detecting the subject on the basis of this photographing condition (white balance XX), it is determined that it is difficult to accurately detect the target event on the basis of this photographing condition, and the second relevance index (80%) linked to this photographing condition is updated to further decrease.

The detected spectral intensity heavily depends on whether or not the target event of the subject is exhibited. In the aforementioned example, it is obvious that the detected spectral intensity heavily depends on whether or not the leaf as the subject exhibits photosynthesis as the target event. However, the spectral intensity is also influenced by suitability of the photographing condition in detection of the target event of the subject in addition to this. It would be conceived that, if the photographing condition for detecting the target event of the subject is not suitable or has low suitability, the spectral intensity becomes low, compared to a case where the suitability is high.

In some cases, If the photographing condition for detecting the target event of the subject is suitable, or suitability is high, the spectral intensity may decrease reversely. In addition, if the suitability is low, the spectral intensity may increase in some cases.

That is, the spectral intensity is influenced by the suitability between the target event of the subject and the photographing condition. According to the present invention, the second relevance index is updated depending on the spectral intensity exhibited by this influence. As a result, the suitability between the target event of the subject and the detection algorithm becomes gradually improved using the second relevance index which is gradually updated.

Although the aforementioned embodiment has been described by exemplifying a multispectrum case, this may similarly apply to a hyperspectrum case. While the hyperspectrum is illustrated as dotted lines in FIGS. 14A-14C, the second relevance index may be updated for this hyperspectrum on the basis of the spectral intensity on the ordinate. In this case, the hyperspectrum photographed by the spectral image capturing device 4 may be acquired. In addition, the multispectrum obtained by the photographing apparatus 5 may be restored to hyperspectrum, and the suitability may be determined on the basis of this hyperspectrum. The restoration from the multispectrum to the hyperspectrum may be performed, for example, on the basis of a predetermined restoration algorithm using the search apparatus 2 or the like. This restoration algorithm may include a template based on a matching relationship between the hyperspectrum and the multispectrum, and this may be read and referenced for restoration as necessary.

Figure 17:
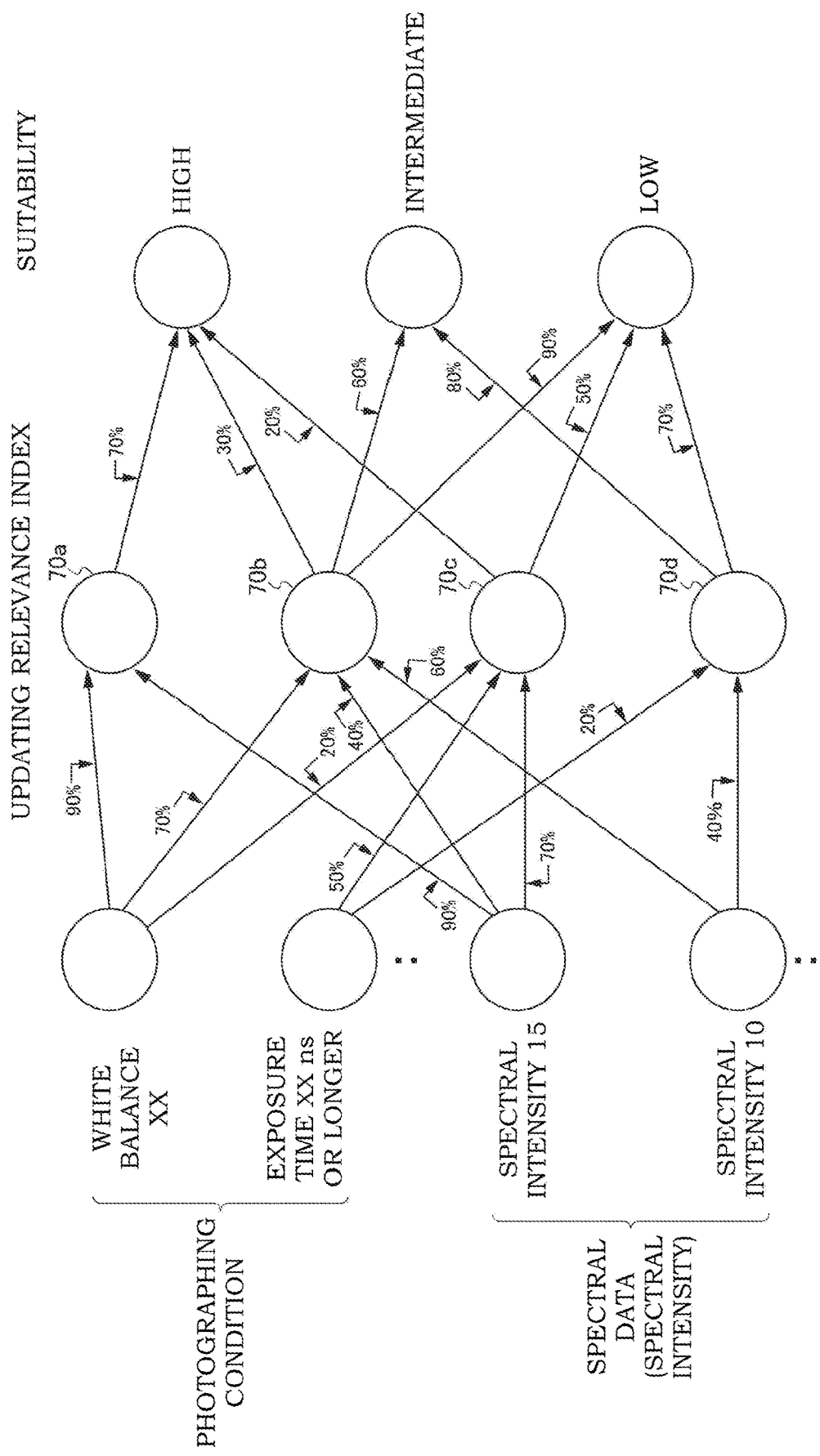
FIG. 17 is a diagram illustrating an example in which the updating processing of the second relevance index is performed on the basis of an updating relevance index.

Such an updating processing may be performed, for example, on the basis of an updating relevance index as illustrated in FIG. 17. For this updating relevance index, the currently set photographing condition and the spectral data obtained by photographing the subject are set in the left side, and the aforementioned suitability is set in the right side while the node 70 is interposed therebetween.

The node 70 includes a combination of the currently set photographing condition and the obtained spectral data (spectral intensity). In addition, the node 70 is respectively linked to suitability as an output solution. Similarly, the updating relevance index is also a relevance index having three or more levels.

Such an updating relevance index is obtained in advance. In addition, the suitability as an output solution is searched on the basis of the currently set photographing condition and the actually obtained spectral intensity by referencing the updating relevance index. A specific search method is similar to that of the second relevance index described above.

Here, in a case where the spectral intensity obtained by photographing the subject using the currently set photographing condition (white balance XX) is "10", the node 70b matches, so that the node 70b has "low" suitability where the updating relevance index is highest. In this case, it is determined that the photographing condition (white balance XX) has low suitability from the viewpoint of the acquired spectral intensity. In addition, the second relevance index of FIG. 10 is reset to decrease.

The second relevance index may be created on the basis of unsupervised learning without limiting to so-called supervised learning in which learning is performed by inputting a known reference target event of a subject and a detection algorithm. In this case, the obtained data may be classified by clustering, and the second relevance index may be created on the basis of the classification of the obtained data.

Note that, while the search solution is searched on the basis of the detected spectral intensity by way of example in the aforementioned embodiments, the search may be performed on the basis of any factor as long as it is based on the spectral data.

According to the present invention, a photographing condition other than the currently set photographing condition of FIG. 17 may also be input. In addition, the search may be performed by inputting the other photographing condition and the spectral data obtained through photographing based on the other photographing condition.

Figure 18:
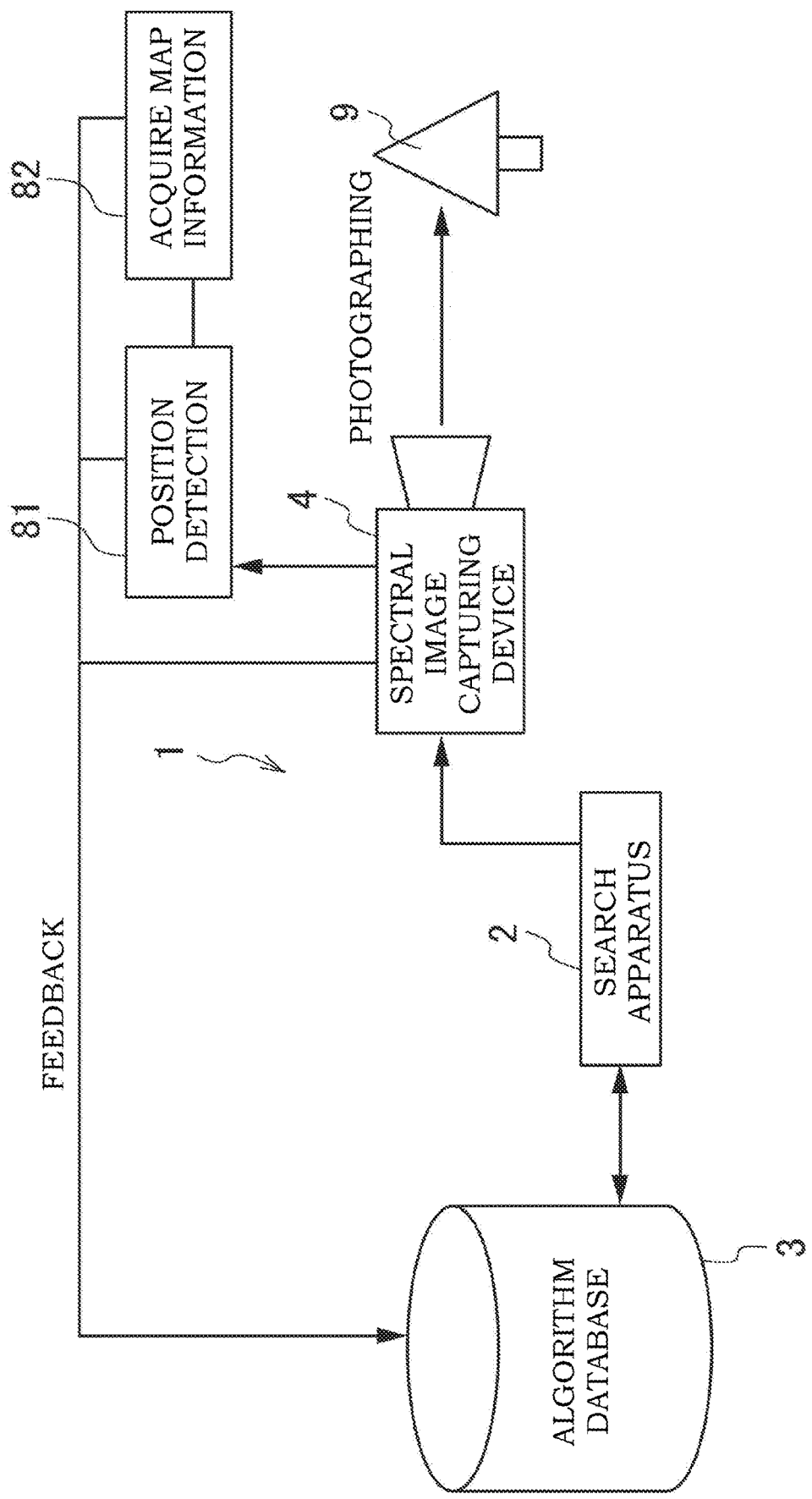
FIG. 18 is a diagram illustrating an exemplary information search system having a feedback loop including location information and map information.

The information search system 1 according to the present invention may have, for example, a feedback loop of FIG. 18. The feedback loop further has a location detector 81 coupled to the spectral image capturing device 4 and a map information acquisition unit 82 coupled to the location detector 81. In the feedback loop of FIG. 18, like reference numerals denote like elements as in the feedback loop of FIG. 13, and they will not be described repeatedly.

The location detector 81 acquires the current location information of the spectral image capturing device 4 in real time on the basis of a satellite positioning signal transmitted from an artificial satellite. Assuming that the spectral image capturing device 4 is mounted on a traveling vehicle, location information at each site on the road where the vehicle travels can be acquired by receiving the satellite positioning signal using the location detector 81 from time to time during a travel of the vehicle on the road. The location information detected by the location detector 81 is transmitted to the algorithm database 3.

The map information acquisition unit 82 stores map information including maps of Japan or maps of various countries in the world. Here, the "map information" includes a two-dimensional map in which a map is described in a two-dimensional manner, a three-dimensional map in which a map is described in a three-dimensional manner, and electronic data implemented on a street view image including an omnidirectional panoramic image photographed at a site on the road. It is possible to display a map on a screen using a PC, a smart phone, a tablet terminal, or the like on the basis of the map information and also execute various operations for the displayed map using an application program. The map information storage unit 82 may acquire electronic data on maps disclosed on the Internet as initial map information or may acquire electronic data of other maps distributed free of charge or commercially available in the market. The map information detected by the map information storage unit 82 is transmitted to the algorithm database 3.

Figure 19:
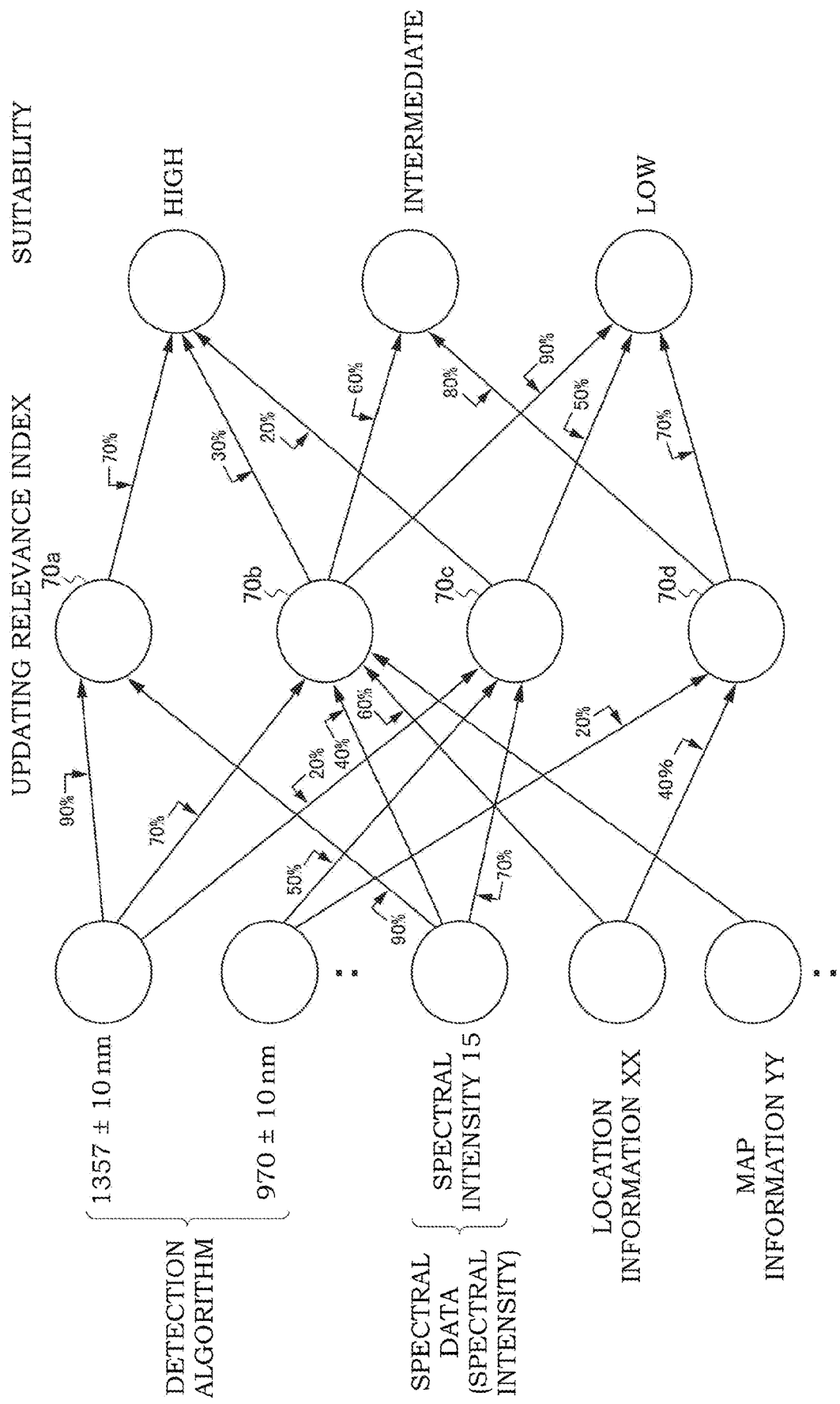
FIG. 19 is a diagram illustrating an example in which the updating processing is performed including location information and map information.

In this case, the updating processing may be performed, for example, on the basis of an updating relevance index as illustrated in FIG. 19. For this updating relevance index, the location information detected by the location detector 81 and the map information detected by the map information storage unit 82 in addition to the currently set detection algorithm and the spectral data obtained by photographing the subject are set in the left side, and the aforementioned suitability is set in the right side while the node 70 is interposed therebetween.

The node 70 includes a combination of the location information and the map information in addition to the currently set detection algorithm and the obtained spectral data (spectral intensity). In addition, the node 70 is respectively linked to the suitability as an output solution. Similarly, the updating relevance index is also a relevance index having three or more levels.

Such an updating relevance index is obtained in advance. In addition, the suitability as an output solution is searched on the basis of the currently set detection algorithm and the actually obtained spectral intensity by referencing the updating relevance index. A specific search method is similar to that of the first relevance index described above.

Figure 20:
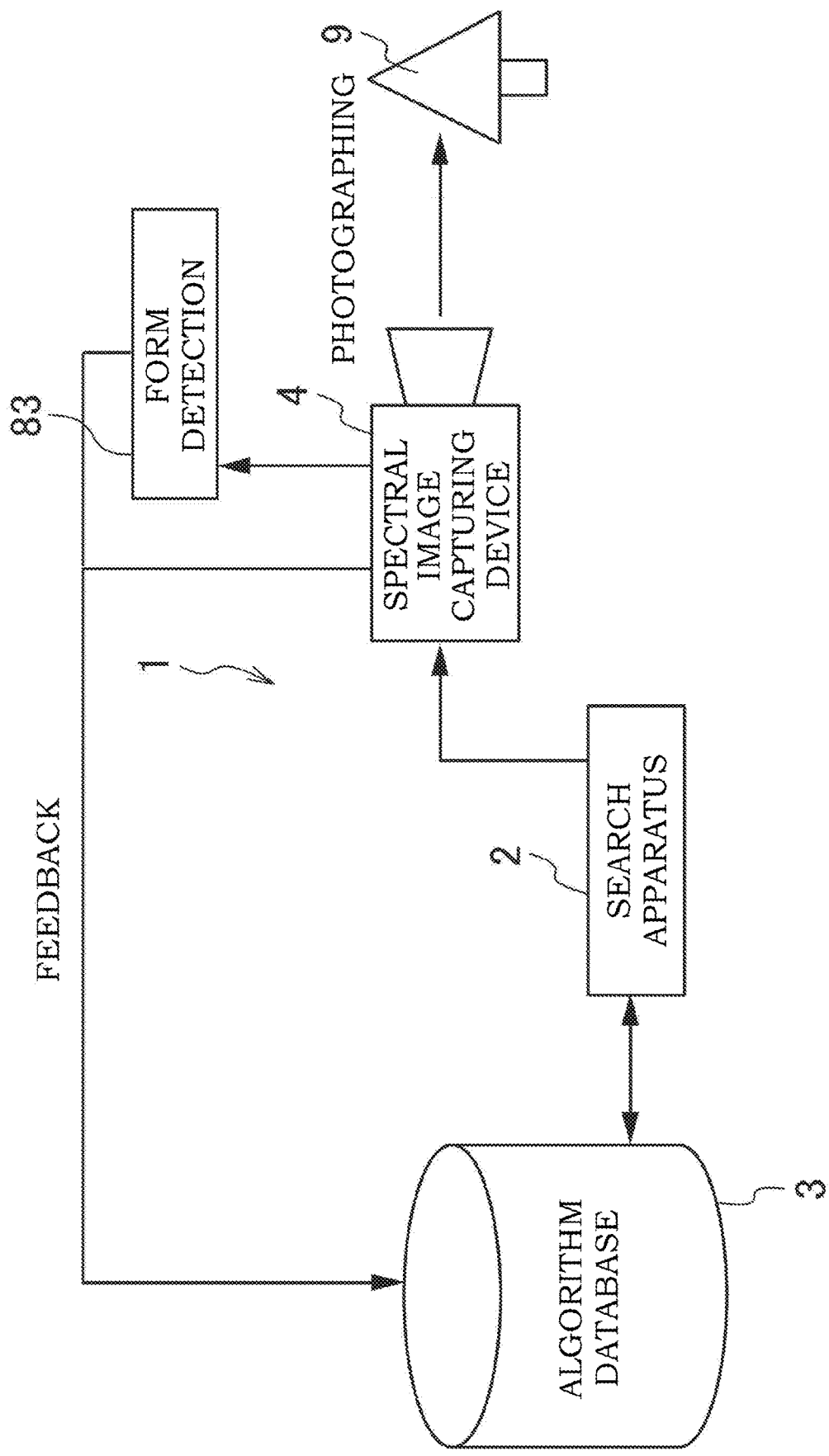
FIG. 20 is a diagram illustrating an exemplary information search system having a feedback loop including form information.

Here, in a case where the spectral intensity obtained by photographing the subject using the currently set detection algorithm (1375±10 nm) is "15", the location information is set to "XX", and the map information is set to "YY", the node 70b matches, so that the node 70b has "low" suitability where the updating relevance index is the highest. In this case, it is determined that the detection algorithm "1375±10 nm" has low suitability from the viewpoint of the acquired spectral intensity. In addition, the first relevance index of FIG. 8 is reset to decrease. The information search system 1 according to the present invention may have, for example, a feedback loop of FIG. 20. The feedback loop further has a form detector 83 coupled to the spectral image capturing device 4. In the feedback loop of FIG. 20, like reference numerals denote like elements as in the feedback loop of FIG. 13 or 18, and they will not be described repeatedly.

The form detector 83 has a camera for photographing the subject 9. A form (such as shape, pattern, color, and texture) of the subject 9 can be identified on the basis of an image of the subject 9 photographed by the form detector 83. The form information of the subject 9 detected by the form detector 83 is transmitted to the algorithm database 3. The form information of the subject 9 may be an image photographed by differently setting a photographing range or a photographing direction as well as an image acquired by photographing the subject 9 only in a certain direction.

Figure 21:
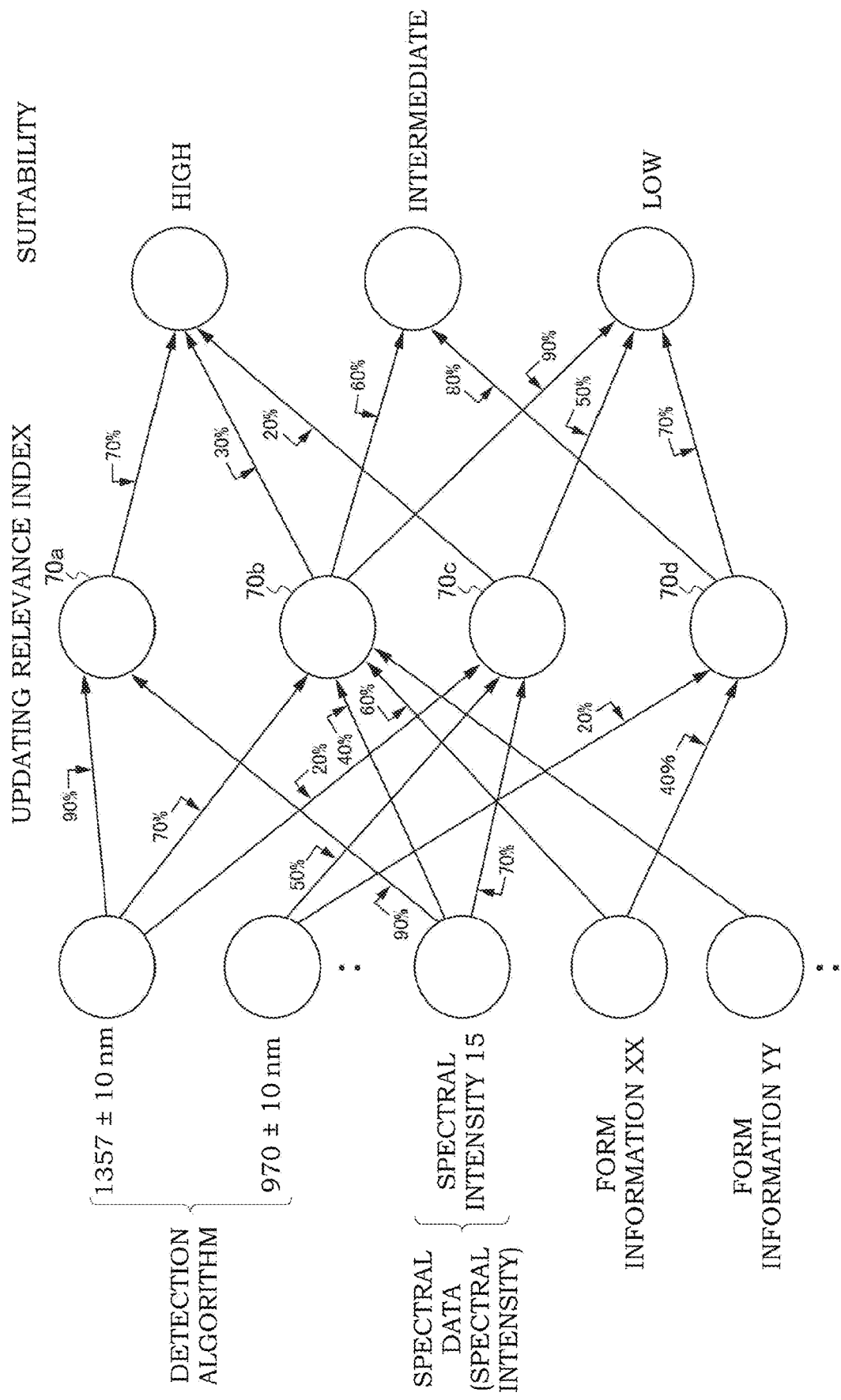
FIG. 21 is a diagram illustrating an example in which the updating processing is performed including form information.

In this case, the updating processing may be performed, for example, on the basis of the updating relevance index as illustrated in FIG. 21. For this updating relevance index, the form information of the subject 9 detected by the form detector 83 in addition to the currently set detection algorithm and the spectral data obtained by photographing the subject are set in the left side, and the aforementioned suitability is set in the right side while the node 70 is interposed therebetween.

The node 70 includes a combination of the form information in addition to the currently set detection algorithm and the obtained spectral data (spectral intensity). In addition, the node 70 is respectively linked to the suitability as an output solution. Similarly, the updating relevance index is also a relevance index having three or more levels.

Such an updating relevance index is obtained in advance. In addition, the suitability as an output solution is searched on the basis of the currently set detection algorithm and the actually obtained spectral intensity by referencing the updating relevance index. A specific search method is similar to that of the first relevance index described above.

Here, in a case where the spectral intensity obtained by photographing the subject using the currently set detection algorithm (1375±10 nm) is "15", the form information is set to a combination of "XX" and "YY", the node 70b matches, so that the node 70b has "low" suitability where the updating relevance index is the highest. In this case, it is determined that the detection algorithm "1375±10 nm" has low suitability from the viewpoint of the acquired spectral intensity. In addition, the first relevance index of FIG. 8 is reset to decrease. Similarly, in the case of the detection algorithm of 970±10 nm and the form information "XX", the node 70d matches, so that the node 70d has "intermediate" suitability where the updating relevance index is the highest. In this case, it is determined that the detection algorithm "970±10 nm" has low suitability from the viewpoint of the acquired spectral intensity. It is possible to improve determination accuracy by performing determination in combination with the form information of the subject 9 in this manner.

Note that the form information may include so-called spatial characteristic information. Here, the "spatial characteristic information" includes a spatial location (arrangement), a form (such as shape, size, pattern, color, and texture), or the like. This spatial characteristic information is a concept including the characteristic amount on the image used in a so-called deep learning technology and is information for identifying a spatial location (arrangement) or a form by extracting it. This spatial characteristic information may also include a spectral characteristic amount extracted on a spectrum basis as well as a typical spatial characteristic amount. Alternatively, the spatial characteristic information may be formed by combining the spatial characteristic amount and the spectral characteristic amount. Since the spectral characteristic amount is obtained by extracting the characteristic amount on the basis of the spectral image, it is possible to easily separate a desired subject from a background movement and extract the characteristic amount. Therefore, it is possible to easily recognize the form information.

Naturally, the determination may be performed in combination with the location information or the map information described above in addition to the form information.

REFERENCE SIGNS LIST 1 information search system
2 search apparatus
3 algorithm database
4 spectral image capturing device
5 photographing apparatus
9, 10, 11 subject
16 image
21 internal bus
23 display unit
24 control unit
25 manipulation unit
26 communication unit
27 search unit
28 memory unit
41 objective lens
42 precise linear motion stage
43 slit plate
43a slit opening
44 Collimator lens
45 dispersive optical element 46 imaging lens
47 image capturing element
48 control unit
51 imaging optical system
52 filter
53 image capturing element
54 signal processing unit
56 image capturing lens
70 node
81 location detector
82 map information storage unit
83 form detector
481 photographing control unit
482 movement control unit
483 spectral data creation unit
484 image processing unit
484-1 correction processing unit
484-2 calculation unit
484-3 color analysis image acquisition unit

DRAWINGS

FIG. 1
3 ALGORITHM DATABASE
2 SEARCH APPARATUS
4 SPECTRAL IMAGE CAPTURING DEVICE
FIG. 2
27 SEARCH UNIT
28 MEMORY UNIT
23 DISPLAY UNIT
21 INTERNAL BUS
24 CONTROL UNIT
25 MANIPULATION UNIT
26 COMMUNICATION UNIT
FIG. 3
42 PRECISE LINEAR MOTION STAGE
48 CONTROL UNIT
FIG. 4
48 CONTROL UNIT
481 PHOTOGRAPHING CONTROL UNIT
482 MOVEMENT CONTROL UNIT
483 SPECTRAL DATA CREATION UNIT
484 IMAGE PROCESSING UNIT
484-1 CORRECTION PROCESSING UNIT
484-2 CALCULATION UNIT
484-3 COLOR ANALYSIS IMAGE ACQUISITION UNIT
FIG. 5
FOCAL POINT CONTROL
54 SIGNAL PROCESSING
FIG. 6
START
S11 INPUT TARGET EVENT OF SUBJECT
S12 TEXT ANALYSIS FOR TARGET EVENT OF SUBJECT
S13 SEARCH DETECTION ALGORITHM INFORMATION
S14 DISPLAY
END
FIG. 7
SPECTRAL INTENSITY
FOR ONE DAY
FOR THREE DAYS
FOR FIVE DAYS
WAVELENGTH
FIG. 8
REFERENCE TARGET EVENT OF SUBJECT
FRESHNESS OF FRUIT
MOISTURE OF HAIR
SALT IN MIXTURE
PHOTOSYNTHESIS OF LEAF
STOMACH CANCER
DEFECT OF GLASS
FIRST RELEVANCE INDEX
DETECTION ALGORITHM INFORMATION
CHARACTERISTIC WAVELENGTH
COMPUTATION METHOD
LINEAR
CLUSTER ANALYSIS
PLS REGRESSION
WEIGHTED AVERAGING
FIG. 9
SUBJECT
GLASS
PLASTIC
METAL
RESIN
SUGAR
SALT
CERAMIC-BASED COMPOSITE MATERIAL
METAL
FOREIGN SUBSTANCE
GLASS
PLASTIC
CERAMICS
REFERENCE TARGET EVENT
DEFECT
DIRT
SALT
CRACK
FOREIGN SUBSTANCE
DEPOSIT
FIRST RELEVANCE INDEX
DETECTION ALGORITHM INFORMATION
CHARACTERISTIC WAVELENGTH
COMPUTATION METHOD
LINEAR
CLUSTER ANALYSIS
PLS REGRESSION
WEIGHTED AVERAGING
FIG. 10
REFERENCE TARGET EVENT OF SUBJECT
FRESHNESS OF FRUIT
MOISTURE OF HAIR
PHOTOSYNTHESIS OF LEAF
STOMACH CANCER
DEFECT OF GLASS
SECOND RELEVANCE INDEX
PHOTOGRAPHING CONDITION
WHITE BALANCE XX LENS ARRANGEMENT P, FILTER W
FILTER Q
FILTER R, ILLUMINATION LIGHT ANGLE XX°
FILTER S, SPATIAL RESOLUTION 133 to 140 dpi
EXPOSURE TIME OF XX ns OR LONGER
EXPOSURE TIME SHORTER THAN XX ns
FIG. 11
FRESHNESS OF FRUIT
FILTER S
SHUTTER SPEED XX seconds
PHOTOSYNTHESIS OF LEAF
DEFECT OF GLASS ILLUMINATION LIGHT ANGLE XX°
SECOND RELEVANCE INDEX
PHOTOGRAPHING CONDITION
WHITE BALANCE XX
LENS ARRANGEMENT P
FILTER Q
FILTER R, ILLUMINATION LIGHT ANGLE XX°
FILTER S, SPATIAL RESOLUTION 133 to 140 dpi
EXPOSURE TIME OF XX ns OR LONGER
EXPOSURE TIME SHORTER THAN XX ns
FIG. 12
INPUT INFORMATION
INFORMATION ON ILLUMINATION LIGHT
WAVELENGTH
IRRADIATION ANGLE
LUMINANCE
etc.
TARGET EVENT OF SUBJECT
PARAMETER OF IMAGING SYSTEM
WAVELENGTH RANGE
WAVELENGTH RESOLUTION
SPATIAL RESOLUTION
SPECTRAL WAVELENGTH SENSITIVITY
PARAMETER OF HARDWARE
DETECTION ALGORITHM INFORMATION
CHARACTERISTIC WAVELENGTH
CHARACTERISTIC WAVELENGTH RANGE
CHARACTERISTIC WAVELENGTH COMPUTATION
SPECTRAL IMAGE CAPTURING DEVICE
COLOR ANALYSIS IMAGE
PHOTOGRAPHING CONDITION
INFORMATION ON ILLUMINATION LIGHT
PHOTOGRAPHING APPARATUS
PARAMETER OF IMAGING SYSTEM
IMAGING OPTICAL SYSTEM
FILTER
IMAGE CAPTURING ELEMENT
SIGNAL PROCESSING UNIT
CHARACTERISTIC WAVELENGTH COMPUTATION
COLOR ANALYSIS IMAGE
FIG. 13
3 ALGORITHM DATABASE
2 SEARCH APPARATUS
4 SPECTRAL IMAGE CAPTURING DEVICE
PHOTOGRAPHING
PHOTOGRAPHING
FEEDBACK
FEEDBACK
FIG. 14
A
MULTISPECTRUM
HYPERSPECTRUM
B
MULTISPECTRUM
HYPERSPECTRUM
C
MULTISPECTRUM
HYPERSPECTRUM
FIG. 15
PHOTOSYNTHESIS IS GENERATED
WAVELENGTH
WAVELENGTH
FIG. 16
DETECTION ALGORITHM
SPECTRAL DATA (SPECTRAL INTENSITY)
SPECTRAL INTENSITY
SPECTRAL INTENSITY
UPDATING RELEVANCE INDEX
SUITABILITY
HIGH
INTERMEDIATE
LOW
FIG. 17
PHOTOGRAPHING CONDITION
WHITE BALANCE XX
EXPOSURE TIME XX ns OR LONGER
SPECTRAL DATA (SPECTRAL INTENSITY)
SPECTRAL INTENSITY
SPECTRAL INTENSITY
UPDATING RELEVANCE INDEX
SUITABILITY
HIGH
INTERMEDIATE
LOW
FIG. 18
ALGORITHM DATABASE
FEEDBACK
SEARCH APPARATUS
SPECTRAL IMAGE CAPTURING DEVICE
PHOTOGRAPHING
POSITION DETECTION
ACQUIRE MAP INFORMATION
FIG. 19
DETECTION ALGORITHM
SPECTRAL DATA (SPECTRAL INTENSITY)
SPECTRAL INTENSITY
LOCATION INFORMATION XX
MAP INFORMATION YY
UPDATING RELEVANCE INDEX
SUITABILITY
HIGH
INTERMEDIATE
LOW
FIG. 20
ALGORITHM DATABASE
FEEDBACK
SEARCH APPARATUS
FORM DETECTION
SPECTRAL IMAGE CAPTURING DEVICE
PHOTOGRAPHING
FIG. 21
DETECTION ALGORITHM
SPECTRAL DATA (SPECTRAL INTENSITY)
SPECTRAL INTENSITY
FORM INFORMATION XX
FORM INFORMATION YY
UPDATING RELEVANCE INDEX
SUITABILITY
HIGH
INTERMEDIATE
LOW

The invention claimed is:

1. An information search system for searching detection algorithm information of spectral data necessary for determining a target event from a photographed subject, the information search system comprising:
a first relational database configured to store a first relevance index having at least three levels between each target event of the subject and the detection algorithm information in advance;
a target event input unit configured to receive information containing text data regarding a target event of the subject to be newly determined by a user;

a search unit configured to search at least one piece of detection algorithm information based on information regarding the target event received by the target event input unit by referencing the first relevance index stored in the first relational database;

a display unit configured to display the detection algorithm information searched by the search unit to a user; and a receive unit configured to receive spectral data obtained by photographing the target event as information regarding the target event of the photographed subject from a photographing terminal that photographs the subject based on the detection algorithm information searched by the search unit, wherein the first relational database updates the first relevance index by increasing or decreasing the first relevance index based on an intensity of the spectral data received by the receive unit.

2. The information search system according to claim 1, further comprising:

a suitability database configured to store, in advance, an updating relevance index having at least three levels between a combination of the detection algorithm information and the spectral intensity and suitability; and a determination unit configured to determine suitability associated at a higher relevance index based on the detection algorithm information searched by the search unit and the intensity of the spectral data received by the receive unit by referencing the updating relevance index stored in the suitability database, wherein the first relational database updates the first relevance index based on the suitability determined by the determination unit.

3. The information search system according to claim 2, wherein the determination unit determines the suitability based on a relationship with an image characteristic amount of the photographed subject.

4. The information search system according to claim 1, wherein the photographing terminal creates, based on the detection algorithm information searched by the search unit, a spectral image representing reflectance or transmittance of the subject for each wavelength based on three-dimensional spectral data having two-dimensional spatial information and one-dimensional wavelength information from two-dimensional spectral data, obtained by photographing the subject, and the target event is determined based on the created spectral image.

5. The information search system according to claim 1, wherein the first relational database stores, in advance, the first relevance index having at least three levels between each target event of the subject and the detection algorithm information for specifying a wavelength range in which the target event can be identified as a characteristic wavelength and specifying a plurality of the characteristic wavelengths.

6. An information search system for searching detection algorithm information of spectral data necessary for determining a target event from a photographed subject, the information search system comprising:

a first relational database configured to store a first relevance index having at least three levels between each reference target event of the subject and the detection algorithm information in advance;

a target event input unit configured to receive information regarding a target event of the subject to be newly determined;

a search unit configured to search detection algorithm information associated at a higher relevance index based on a first relevance index having at least three levels between a reference target event corresponding to information regarding the target event received by the target event input unit and the detection algorithm information by referencing the first relevance index stored in the first relational database;

a receive unit configured to receive multispectral data as information regarding the target event of the photographed subject from a photographing terminal that photographs the subject based on the detection algorithm information searched by the search unit; and a data restoration unit configured to restore hyperspectral data based on the multispectral data received by the receive unit, wherein the first relational database updates the first relevance index by increasing or decreasing the first relevance index based on the spectral data restored by the data restoration unit.

7. An information search system for searching a photographing condition of a photographing apparatus for determining a target event from a photographed subject, the information search system comprising:

a second relational database configured to store a second relevance index having at least three levels between each reference target event of the subject and each photographing condition in advance;

a target event input unit configured to receive information regarding a target event of the subject to be newly determined;

a search unit configured to search a photographing condition associated at a higher relevance index based on a second relevance index having at least three levels between a reference target event corresponding to information regarding the target event received by the target event input unit and each photographing condition by referencing the second relevance index stored in the second relational database; and a receive unit configured to receive spectral data obtained by photographing the target event as information regarding the target event of the photographed subject from a photographing terminal that photographs the subject based on the photographing condition searched by the search unit, wherein the second relational database updates the second relevance index by increasing or decreasing the second relevance index based on an intensity of the spectral data received by the receive unit.

8. The information search system according to claim 7, wherein:

the second relational database stores, in advance, the second relevance index having at least three levels between each reference target event of the subject and the photographing condition, the photographing condition including at least a transmission wavelength of a filter, and the photographing terminal has an imaging optical system that condenses light from the subject to form an image on an image plane of an image capturing element, and a filter arranged in the middle of an optical path to the image capturing element to transmit only light belonging to a predetermined wavelength region and reflect light of other wavelength regions, and is configured to sequentially switch a plurality of filters having different transmission wavelength regions based on the photographing condition including the transmission wavelength of the filter searched by the search unit.

9. An information search system for searching a photographing condition of a photographing apparatus for determining a target event from a photographed subject, the information search system comprising:
   a second relational database configured to store a second relevance index having at least three levels between each reference target event of the subject and each photographing condition in advance;
   a target event input unit configured to receive information regarding a target event of the subject to be newly determined;
   a search unit configured to search a photographing condition associated at a higher relevance index based on a second relevance index having at least three levels between a reference target event corresponding to information regarding the target event received by the target event input unit and each photographing condition by referencing the second relevance index stored in the second relational database;
   a receive unit configured to receive multispectral data as information regarding the target event of the photographed subject from a photographing terminal that photographs the subject based on the photographing condition searched by the search unit; and
   a data restoration unit configured to restore hyperspectral data based on the multispectral data received by the receive unit,
   wherein the second relational database updates the second relevance index by increasing or decreasing based on the spectral data restored by the data restoration unit.

10. The information search system according to claim 1, wherein the first relational database updates the first relevance index by configuring the first relevance index having at least three levels with a neural network.

11. The information search system according to claim 2, wherein the first relational database updates the first relevance index by configuring the first relevance index having at least three levels with a neural network.

12. The information search system according to claim 3, wherein the first relational database updates the first relevance index by configuring the first relevance index having at least three levels with a neural network.

13. The information search system according to claim 4, wherein the first relational database updates the first relevance index by configuring the first relevance index having at least three levels with a neural network.

14. The information search system according to claim 5, wherein the first relational database updates the first relevance index by configuring the first relevance index having at least three levels with a neural network.

15. The information search system according to claim 6, wherein the first relational database updates the first relevance index by configuring the first relevance index having at least three levels with a neural network.

16. The information search system according to claim 7, wherein the second relational database updates the second relevance index by configuring the second relevance index having at least three levels with a neural network.

17. A non-transitory recording medium having stored thereon an information search program for searching detection algorithm information of spectral data necessary for determining a target event from a photographed subject, the information search program causing a computer to execute:
   a relevance index acquiring step of acquiring a first relevance index having at least three levels between each reference target event of the subject and the detection algorithm information in advance;
   a target event input step of inputting information regarding a target event of the subject to be newly determined;
   a search step of searching the detection algorithm information associated at a higher relevance index based on a first relevance index having at least three levels between a reference target event corresponding to information regarding the target event input in the target event input step and the detection algorithm information by referencing the first relevance index acquired in the relevance index acquiring step; and
   a receiving step of receiving spectral data obtained by photographing the target event as the information regarding the target event of the photographed subject from a photographing terminal that photographs the subject based on the detection algorithm information searched in the search step,
   wherein, in the relevance index acquiring step, the first relevance index is updated by increasing or decreasing the first relevance index based on an intensity of the spectral data received in the receiving step.

18. A non-transitory recording medium having stored thereon an information search program for searching detection algorithm information of spectral data necessary for determining a target event from a photographed subject, the information search program causing a computer to execute:
   a relevance index acquiring step of acquiring a first relevance index having at least three levels between each reference target event of the subject and the detection algorithm information in advance;
   a target event input step of inputting information regarding a target event of the subject to be newly determined;
   a search step of searching detection algorithm information associated at a higher relevance index based on a first relevance index having at least three levels between a reference target event corresponding to information regarding the target event input in the target event input step and the detection algorithm information by referencing the first relevance index acquired in the relevance index acquiring step;
   a receiving step of receiving multispectral data as information regarding the target event of the photographed subject from a photographing terminal that photographs the subject based on the detection algorithm information searched in the search step; and
   a data restoration step of restoring hyperspectral data based on the multispectral data received in the receiving step,
   wherein, in the relevance index acquiring step, the first relevance index is updated by increasing or decreasing the first relevance index based on the spectral data restored in the data restoration step.

19. A non-transitory recording medium having stored thereon an information search program for searching a photographing condition of a photographing apparatus for determining a target event from a photographed subject, the information search program causing a computer to execute:
   a relevance index acquiring step of acquiring a second relevance index having at least three levels between each reference target event of the subject and each photographing condition in advance;
   a target event input step of inputting information regarding a target event of the subject to be newly determined;

a search step of searching a photographing condition associated at a higher relevance index based on a second relevance index having at least three levels between a reference target event corresponding to information regarding the target event input in the target event input step and each photographing condition by referencing the second relevance index acquired in the relevance index acquiring step; and a receiving step of receiving spectral data obtained by photographing the target event as information regarding the target event of the photographed subject from a photographing terminal that photographs the subject based on the photographing condition searched in the search step, wherein, in the relevance index acquiring step, the second relevance index is updated by increasing or decreasing the second relevance index based on an intensity of the spectral data received in the receiving step.

20. A non-transitory recording medium having stored on an information search program for searching a photographing condition of a photographing apparatus for determining a target event from a photographed subject is stored, the information search program causing a computer to execute:

a relevance index acquiring step of acquiring a second relevance index having at least three levels between each reference target event of the subject and each photographing condition in advance;

a target event input step of inputting information regarding a target event of the subject to be newly determined;

a search step of searching a photographing condition associated at a higher relevance index based on a second relevance index having at least three levels between a reference target event corresponding to information regarding the target event input in the target event input step and each photographing condition by referencing the second relevance index acquired in the relevance index acquiring step;

a receiving step of receiving multispectral data as information regarding the target event of the photographed subject from a photographing terminal that photographs the subject based on the photographing condition searched in the search step; and a data restoration step of restoring hyperspectral data based on the multispectral data received in the receiving step, wherein, in the relevance index acquiring step, the second relevance index is updated by increasing or decreasing the second relevance index based on the spectral data restored in the data restoration step.

* * * * *